United States Patent
Wegman et al.

(10) Patent No.: US 6,347,648 B1
(45) Date of Patent: Feb. 19, 2002

(54) POWDER FILLING UTILIZING VIBROFLUIDIZATION

(75) Inventors: Paul M. Wegman, Pittsford; Joseph S. Zelazny, Webster; Mikhail Vaynshteyn, Rochester, all of NY (US); Fumii Higuchi; Joseph C. Barbisan, both of Mississauga (CA); Oleg Y. Abramov, St. Petersburg (RU); Sergei D. Ryabov, St. Petersburg (RU); Yuri A. Yudin, St. Petersburg (RU); Alexander G. Kashkarov, St. Petersburg (RU); Alexander N. Gerasimov, St. Petersburg (RU); Victor A. Kouzmitchev, St. Petersburg (RU)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/713,899

(22) Filed: Nov. 16, 2000

Related U.S. Application Data

(60) Division of application No. 09/272,545, filed on Mar. 19, 1999, now Pat. No. 6,196,278, which is a continuation-in-part of application No. 08/823,034, filed on Apr. 1, 1997, now Pat. No. 5,909,829.

(51) Int. Cl.⁷ ............................... B65B 1/04; B65B 3/04
(52) U.S. Cl. .................. 141/1; 141/2; 141/172
(58) Field of Search ............................ 141/1, 2, 10, 18, 141/71, 74, 129, 133, 134, 172, 275; 366/196; 222/DIG. 1, 185.1, 216, 220, 226, 196

(56) References Cited

U.S. PATENT DOCUMENTS

| | | | |
|---|---|---|---|
| 2,822,934 A | 2/1958 | Bartelt | 214/17 |
| 3,251,512 A | 5/1966 | Irving | 222/232 |
| 4,561,759 A | 12/1985 | Knott | 355/3 DD |
| 4,589,234 A | 5/1986 | Rebhan et al. | 51/417 |
| 4,650,312 A | 3/1987 | Vineski | 355/15 |
| 4,932,355 A | 6/1990 | Neufeld | 118/652 |
| 4,977,428 A | 12/1990 | Sakakura et al. | 355/245 |
| 5,095,338 A | 3/1992 | Hayes, Jr. et al. | 355/246 |
| 5,337,794 A | 8/1994 | Nishiyama et al. | 141/144 |
| 5,339,998 A | 8/1994 | Warren | 222/241 |
| 5,438,396 A | 8/1995 | Mawdesley | 355/260 |
| 5,685,348 A | 11/1997 | Wegman et al. | 141/2 |
| 5,727,607 A * | 3/1998 | Ichikawa et al. | 141/67 |
| 5,839,485 A | 11/1998 | Wegman et al. | 141/129 |
| 5,909,829 A | 6/1999 | Wegman et al. | 222/232 |
| 5,921,295 A | 7/1999 | Zelazny et al. | 141/286 |
| 5,947,169 A | 9/1999 | Wegman et al. | 141/71 |
| 6,000,446 A | 12/1999 | Wegman et al. | 141/131 |

FOREIGN PATENT DOCUMENTS

GB 2020635 11/1979

OTHER PUBLICATIONS

Borde et al, "Heat and Mass Transfer in a Moving Vibrofluidized Granular Bed", Powder Handling and Processing, vol. 9, No. 4, Oct./Dec. 1997, pp 311–314.

Goldshtein et al, "Mechanics of Collisional Motion of Granular Materials", J. Fluid Mech (1995), vol. 287, pp. 349–382.

* cited by examiner

Primary Examiner—Timothy L. Maust
(74) Attorney, Agent, or Firm—Andrew D. Ryan

(57) ABSTRACT

A method for filling a powder container, including the steps of placing a first powder container to be filled in filling relationship to a supply of powder in a vessel, vibrofluidizing the powder in the vessel to improve its flow properties, dispensing powder from the vessel into the first container, removing the first container from the vessel, and placing a second container to be filled in filling relationship to the vessel.

11 Claims, 16 Drawing Sheets

POWDER FILLING UTILIZING VIBROFLUIDIZATION

This application is a divisional of Ser. No. 09/272,545, filed Mar. 19, 1999, now U.S. Pat. No. 6,196,278, which is a continuation-in-part of U.S. patent application Ser. No. 08/823,034, filed Apr. 1, 1997, now, U.S. Pat. No. 5,909,829.

This invention relates generally to filling a container with material, and more particularly concerns an vibratory powder filler for moving powders such as toner from a supply hopper through a fill tube to a container.

Currently when filling powders, for example toners into toner containers, toner is transported from the toner supply hopper into the container by a rotating auger. The auger is a spiral shaped mechanical part which pushes particles of toner inside a fill tube by direct mechanical contact. The nature of this mechanical contact process creates substantial limitations on accuracy and productivity of the toner filling operation. The speed of the toner movement in the fill tube is proportional to the speed of rotation of the auger and is limited by heat release due to auger/toner friction. High auger speed will cause the toner to melt, particularly for low melt toner such as disclosed in U.S. Pat. No. 5,227,460 to Mahabadi et al. the relevant portions thereof incorporated herein by reference.

Toner containers typically have a small opening into which the toner is to be added. Furthermore, the toner containers often have irregular shapes to conform to the allotted space within the copying machine. Therefore it becomes difficult to fill the toner container because of the small tube required to fit into the small toner container opening and secondly for all the toner within the container to completely fill the remote portions of the container before the container overflows.

The problems associated with controlling the filling of toner containers are due primarily to the properties of the toner. Toner is the image-forming material in a developer which when deposited by the field of an electrostatic charge becomes the visible record. There are two different types of developing systems known as one component and two component systems.

In one-component developing systems, the developer material is toner made of particles of magnetic material, usually iron, embedded in a black plastic resin. The iron enables the toner to be magnetically charged. In two-component systems, the developer material is comprised of toner which consists of small polymer or resin particles and a color agent, and carrier which consists of roughly spherical particles or beads usually made of steel. An electrostatic charge between the toner and the carrier bead causes the toner to cling to the carrier in the development process. Control of the flow of these small, abrasive and easily charged particles is very difficult.

The one component and two component systems utilize toner that is very difficult to flow. This is particularly true of the toner used in two component systems, but also for toner for single-component systems. The toner tends to cake and bridge within the hopper. This limits the flow of toner through the small tubes which are required for addition of the toner through the opening of the toner container. Also, this tendency to cake and bridge may cause air gaps to form in the container resulting in partial filling of the container.

Attempts to improve the flow of toner have also included the use of an external vibrating device to loosen the toner within the hopper. These vibrators are energy intensive, costly and not entirely effective and consistent. Furthermore, they tend to cause the toner to cloud causing dirt to accumulate around the filling operation.

The following disclosures may be relevant to various aspects of the present invention:

U.S. Pat. No. 5,337,794

Patentee: Nishiyama et al.

Issue Date: Aug. 16, 1994

U.S. Pat. No. 5,438,396

Patentee: Mawdesley

Issue Date: Aug. 1, 1995

U.S. Pat. No. 5,095,338

Patentee: Hayes, Jr. et al.

Issue Date: Mar. 10, 1992

U.S. Pat. No. 4,977,428

Patentee: Sakakura et al.

Issue Date: Dec. 11, 1990

U.S. Pat. No. 4,932,355

Patentee: Neufeld

Issue Date: Jun. 12, 1990

U.S. Pat. No. 4,650,312

Patentee: Vineski

Issue Date: Mar. 17, 1987

U.S. Pat. No. 4,561,759

Patentee: Knott

Issue Date: Dec. 31, 1985

U.S. Pat. No. 5,839,485

Patentee: Wegman et al

Issue Date: Nov. 24, 1998

U.S. Pat. No. 5,685,348

Patentee: Wegman et al

Issue Date: Nov. 11, 1997

U.S. patent application Ser. No. 08/823,034

Applicant: Wegman et al

Filing Date: Apr. 1, 1997

U.S. patent application Ser. No. 08/829,925

Applicant: Wegman et al

Filing Date: Apr. 1, 1997

U.S. patent application Ser. No. 08/923,016

Applicant: Joseph S. Zelazny et al.

Filing Date: Sep. 3, 1997

U.S. patent application Ser. No. 09/004,457

Applicant: Wegman et al.

Filing Date: Jan. 8, 1998

Heat and Mass Transfer in a Moving Vibrofluidized Granular Bed

Authors: I. Borden, M. Dukhovny and T. Elperin

Powder Handling and Processing

Volume 9, No. 4 October/December 1997

Mechanics of Collisional Motion of Granular Materials

Authors: A. Goldshtein, M. Shapiro, L. Moldavsky and M. Fichman

J. Fluid Mech. (1995) Vol. 287

The relevant portions of the foregoing disclosures may be briefly summarized as follows:

U.S. Pat. No. 5,337,794 describes a powder filling apparatus and a method for filling a container with powder. The toner container is filled by conveying toner from a supply hopper through a nozzle with a valve on the end. The valve is disposed at the bottom opening of the nozzle to release and close the opening of the nozzle by the vertical movement of the valve element.

U.S. Pat. No. 5,438,396 is drawn to a toner anti-dribble device which is attached to a toner container having a vertical fill tube and a rotatable auger for feeding toner into a toner container. The toner anti-dribble device also has a sleeve member engagable with the fill tube. A plurality of flexible insertion wires are inserted through the sleeve member into the toner container and disposed substantially perpendicular to the insertion direction of the toner. The arrangement of the wires positively prevents toner dribble between fills while being flexible enough to flex in proportion to the fill rate, which prevents fusing of the toner on the wires.

U.S. Pat. No. 5,095,338 teaches a developer which discharges used carrier particles using a magnetic valve. Discharge of developer material from the developer housing is controlled by a permanent magnet and an electromagnet positioned adjacent an exit port in the developer housing. The permanent magnet generates a magnetic flux field in the region of the exit port to form a developer material curtain which prevents the passage of developer material from the exit port. When the electromagnet is energized, it generates a magnetic flux field which attracts developer material from the developer material curtain. Upon de-energization of the electromagnet, the developer material attracted to it is discharged.

U.S. Pat. No. 4,977,428 discloses an electrographic printer having a pulse motor for driving an agitator. The agitator is built into the developer unit. The agitator is controlled during the initialization process of the apparatus by setting the rotational speed of the motor at a lower level upon startup of the motor. The lower speed results in higher torque to overcome solidification of the toner.

U.S. Pat. No. 4,932,355 discloses a method for removing a developer mix from a developing station with a magnetic closing device which is in the vicinity of a discharge opening in the developing station. In its energized condition, the magnetic closing device creates a magnetic field which acts on the developer mix to form a plug of developer mix in the region of the discharge opening. In the de-energized condition, the magnetic closing device releases the plug of developer mix.

U.S. Pat. No. 4,650,312 discloses a structure for minimizing bridging or packing of toner in the flights of an auger of a toner removal and collection system. The toner anti-bridging structure includes a pendulum which is caused to periodically bang in to the auger to create vibrations in the auger structure.

U.S. Pat. No. 4,561,759 discloses a device for filling and filtering toner from a supply container. A filter basket is disposed in the region of the filling opening which is closed from the feed container by a filter mesh and an electric vibrator connected thereto by a linkage which can be automatically triggered at the beginning of a filling operation.

U.S. Pat. No. 5,839,485 which is assigned to the same assignee as the present application, teaches a method and apparatus for filling a container with a magnetic material using an electromagnetic valve and a demagnetizing circuit to control the flow and properties of the material. In the filling process an auger located inside of the fill tube rotates and moves the material through the fill tube. When the container is filled, the auger stops rotating and the electromagnetic valve is actuated. The electromagnetic valve supplies a magnetic field which holds the material in place, plugging the fill tube with the material as the container is removed and a new container is placed to be filled. When the electromagnetic valve is switched off, a demagnetizing circuit is activated. After the material is demagnetized the auger is switched on and the material flows again to fill the container.

U.S. Pat. No. 5,685,348 which is assigned to the same assignee as the present application, teaches a method and apparatus for filling a container with toner using a series of traveling magnetic fields to control the flow of toner from a supply of toner to the container. Initially, an empty container is placed under a fill tube through which the toner will be supplied to the container. In the filling process the traveling magnetic fields, which are supplied by turning on and off a series of solenoids, and gravity cause toner from the toner supply to move through the fill tube. When a solenoid is turned on toner particles are attracted to its magnetic field where a plug of toner is formed. The solenoids are controlled so that a discrete amount of toner is supplied in each on/off cycle of the solenoids. The solenoid on/off cycle is repeated until the container is filled with toner. When the container is filled, the appropriate solenoid is activated so that a plug of toner stops the flow of toner in the fill tube. The filled container is removed from the fill tube and an empty container is put in its place so that the solenoid on/off cycle may begin again.

U.S. patent application Ser. No. 08/823,034, which is assigned to the same assignee as the present application, teaches a method for filling a powder container is provided. The method includes the steps of placing a first powder container to be filled in filling relationship to a supply of powder in a vessel, mechanically exciting the powder in the vessel to improve its flow properties, dispensing powder from the vessel into the first container, removing the first container from the vessel, and placing a second container to be filled in filling relationship to the vessel.

U.S. patent application Ser. No. 08/829,925, which is assigned to the same assignee as the present application, teaches a method for filling a powder container is provided. The method includes the steps of placing a first powder container to be filled in filling relationship to a discharge feature in the vessel, directing the powder in the vessel toward a member located at least partially within the vessel, the member defining a restriction therein such that the powder clogs within the restriction, mechanically exciting the powder at least adjacent the restriction to improve the flow properties of the powder so as to unclog the powder within the restriction, dispensing powder through the restriction, through the discharge feature and into the first container, stopping the mechanical excitation of the powder so as to clog the restriction with the powder, removing the first container from the vessel, and placing a second container to be filled in filling relationship to the vessel.

U.S. patent application Ser. No. 08/923,016, which is assigned to the same assignee as the present application, teaches a method for filling a powder container with a supply of powder in a hopper. The method includes the steps of placing a first powder container to be filled in filling relationship to a conduit extending downwardly from the hopper, directing the powder in the hopper toward a nozzle in communication with the hopper, the nozzle defining a restriction therein, defining an inlet cross sectional area perpendicular to the flow the powder and outlet defining an outlet cross sectional area perpendicular to the flow the powder, selecting the inlet cross sectional area to be larger than the outlet cross sectional area, selecting the dimensions of said nozzle so as to provide a ratio of the inlet cross sectional area to the outlet cross sectional area of approximately two to one such that the flow of powder does not seize as it progresses through the nozzle, dispensing powder through the conduit, through the nozzle feature and into the first container, removing the first container from the hopper, and placing a second container to be filled in filling relationship to the hopper.

U.S. patent application Ser. No. 09/004,457, which is assigned to the same assignee as the present application, teaches an apparatus for controlling filling of a container from a hopper containing a supply of powder is provided. The apparatus includes a conduit for guiding the powder from the hopper toward the container. The conduit is operably associated with the hopper. The apparatus further includes a pliable member positioned at least partially within the conduit. The pliable member is positional into a first position wherein a passageway is formed within the conduit and into a second position wherein the pliable member serves to block flow of powder through the conduit, whereby said pliable member may controllably permit and block the flow of powder thorough said conduit.

Heat and Mass Transfer in a Moving Vibrofluidized Granular Bed teaches the study theoretically and experimentally of the drying rate of granular particles in the vibrofluidized bed dryer with mechanical vibrations. The combined effects of geometry, gas dynamics and thermal physical parameters were analyzed using the developed mathematical model. This model employs a coefficient which is determined experimentally and describes the drying rate at the falling rate period of drying. The results are compared with experimental data obtained for drying of sand particles in a one stage dryer.

Mechanics of Collisional Motion of Granular Materials teaches experimental data which revealed that for constant vibration amplitudes greater than 1 cm with a frequency increasing from 0, all layers of a granular particle pass through three vibrational states. The respective behaviors of these three vibrational states being as of (i) a solid plastic body, (ii) a liquid, (iii) a gas. In the liquid like vibration state, transferous waves propagate along the layer width. These waves were shown to be gravitational resonance waves, with the corresponding frequencies well correlated by the known formula for incompressible liquids. In the gas like vibrational state, compression (shock) an expansion wave propagation across the layer height were observed.

All of the above references are hereby incorporated by reference in their entirety

SUMMARY

In accordance with one aspect of the present invention, there is provided a method for filling a powder container. The method includes the steps of placing a first powder container to be filled in filling relationship to a supply of powder in a vessel, vibrofluidizing the powder in the vessel to improve its flow properties, dispensing powder from the vessel into the first container, removing the first container from the vessel, and placing a second container to be filled in filling relationship to the vessel.

Pursuant to another aspect of the present invention, there is provided an apparatus for assisting the flow of powder from a hopper containing a supply of powder into a vessel. The apparatus includes a first member operably associated with the hopper and configured to be cyclically driven to vibrofluidize the powder.

Pursuant to yet another aspect of the present invention, there is provided an apparatus for assisting the flow of marking particles from a hopper containing a supply of marking particles into a vessel. The apparatus includes a first member operably associated with the hopper and configured to be cyclically driven to vibrofluidize the marking particles.

DRAWINGS

Other features of the present invention will become apparent as the following description proceeds and upon reference to the drawings, in which.

Figure 14:
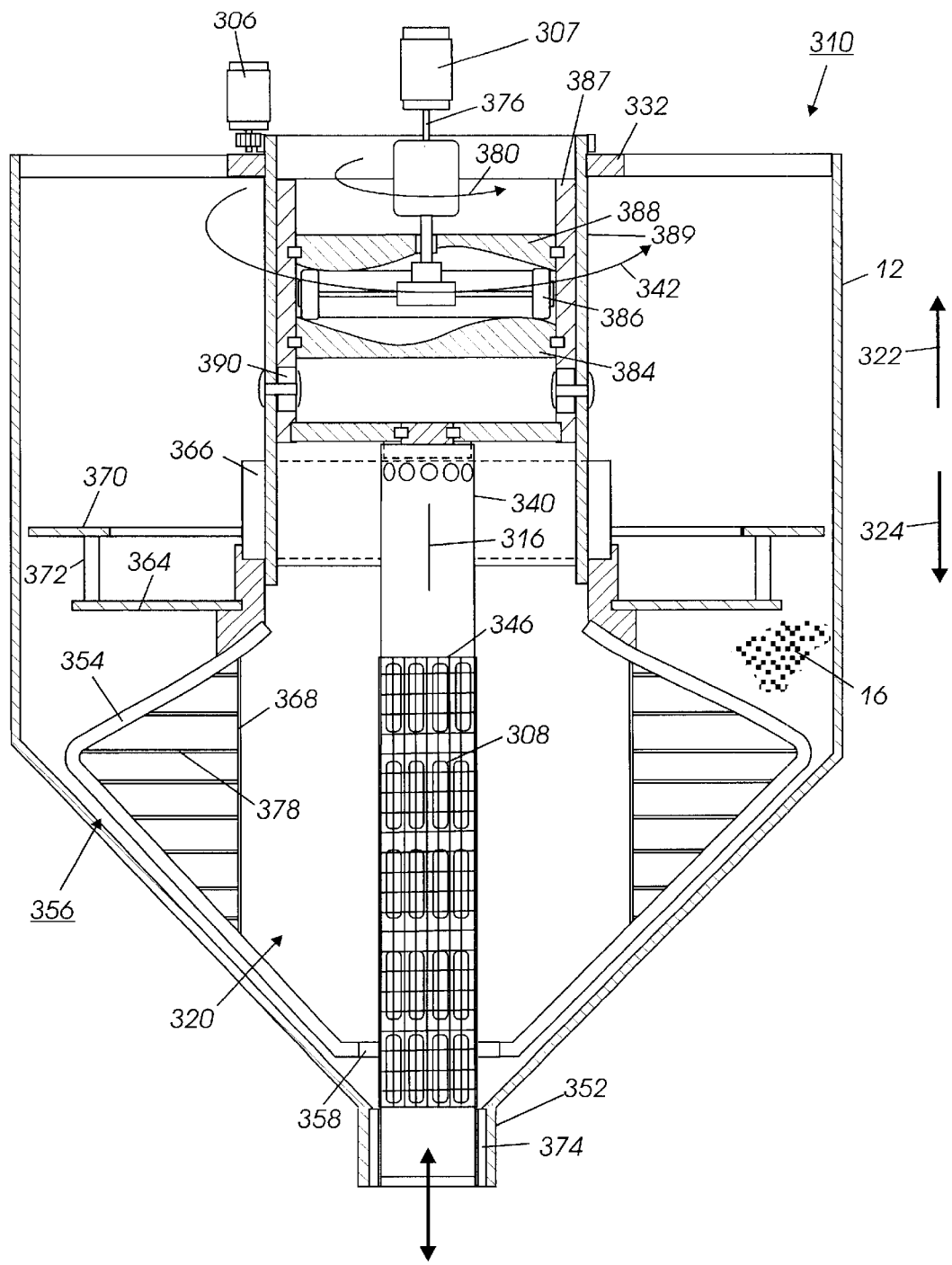
Figure 15:
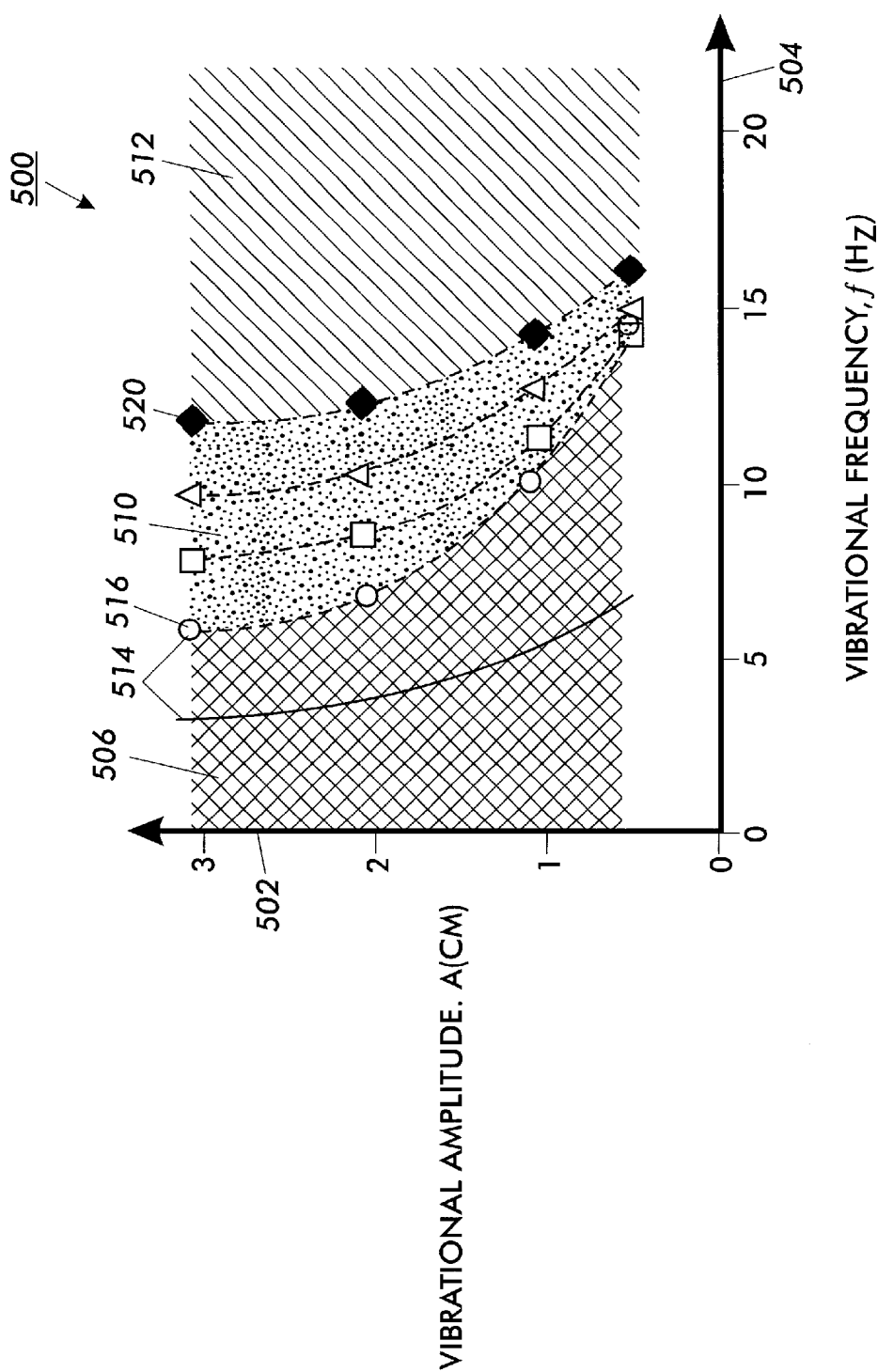
Figure 16:
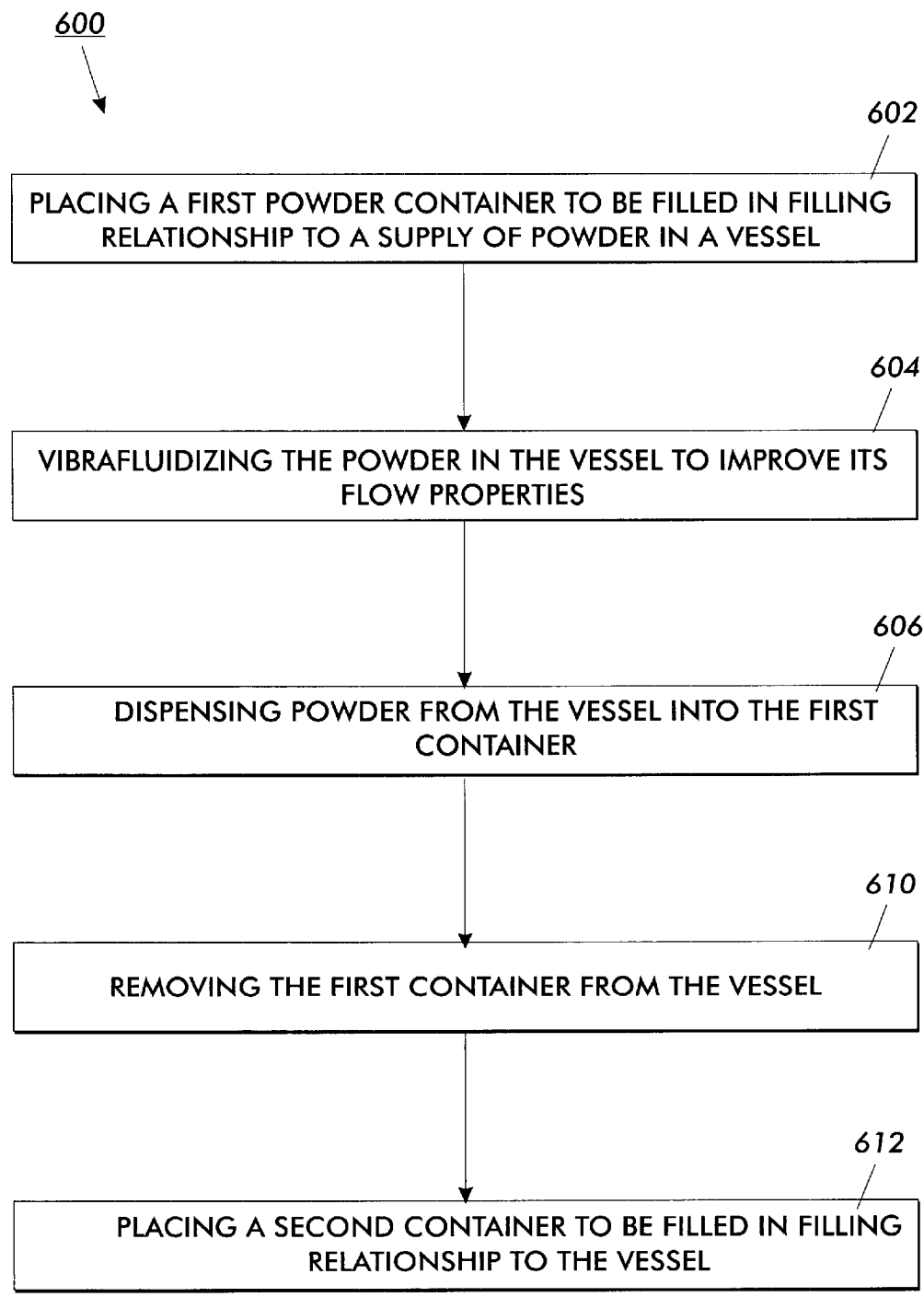

FIG. 14 is a cross-sectional schematic view of another alternate embodiment of a vibratory filler for developer material for use in the vibrofluidization powder filling process of the present invention; and FIG. 15 is a graph of the phase states if vibrationally excited granular materials; and FIG. 16 is a flow diagram of the method for filling a powder container according to the present invention utilizing vibrofluidization of the powder.

DETAILED DESCRIPTION

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

As described earlier, the article Mechanics of Collisional Motion of Granular Materials, by A. Goldshtein et al, contrary to generally accepted theory and experimentation which determines that large granules behave like a solid plastic body, the Goldshtein article reveals that for constant vibration amplitudes greater than 1 cm and with a frequency increasing from 0 all layers pass through three vibrational states with the respective behaviors being of a solid plastic body, a liquid, and a gas.

Referring now to FIG. 15, a graph 500 of vibrational amplitude versus vibrational frequency for a granular particle is shown. The vibrational amplitude A in centimeters is plotted on ordinate 502 while the vibrational's frequency F in hertz is plotted on the abscissa 504. The graph 500 includes three distinct areas representing the three states of the granular material. The first of these states is a solid-like state 506 as shown in the checked pattern. The second of these states is a liquid-like state 510 as shown in the dotted pattern. The third of these states is a gas-like state 512 as shown in the diagonal line pattern.

Plotted on the graph 500 are several spaced apart curved lines 514 in the form of isostates or lines of constant vibrational state. A first isostate 516 separates the solid-like state 506 from the liquid-like state 510. A second isostate 520 separates the liquid-like state 510 from the gas-like state 512. The liquid-like state is thus formed by the boundaries of the first isostate 516 and the second isostate 520.

For the granular material shown in the graph 500, the liquid-like state 510 ranges in vibrational frequency from about 7 Hz to about 16 Hz. Correspondingly, the liquid-like state 510 is bound by a minimum vibrational amplitude A of approximately 0.5 cm.

The applicants have found that by exciting powders or granular material with an amplitude and frequency corresponding to the liquid like state 510 as depicted in FIG. 15, the flow of material through a conduit with materials in a liquid like state can be greatly accelerated. For example, applicants have that when operating in the liquid like state as shown in FIG. 15, the volume of the powder within a conduit increases by approximately 10 percent. Also, applicants have found that to excite powders with a particle size of 0 to 70 microns into a liquid like state, the materials are preferably subjected to an acceleration of at least 32.2 feet per second square or 1 g or one gravitational force in upwardly direction with a frequency of at least 60 HZ and an amplitude not less than 0.2 cm (2 mm).

The greatly improved flow of powders may also be explained by the fact that the excitation of the particles in upwardly direction assists in the separation of adjacent particles which thereby reduces the frictional forces and other forces between adjacent particles. An additional volume per unit mass of toner results from the excitation of the particles and the additional volume is comprised of air. The air penetration between the particles decreases the friction between the particles.

Referring now to FIG. 16, a method 600 for filling a powder container is shown. The method 600 includes a first step 602 of placing a first powder container to be filled in a filling relationship to a supply of powder in a vessel. The method 600 includes a second step 604 of vibrofluidizing the powder in the vessel to improve its flow properties. The method 600 further includes a third step 606 of dispensing the powder from the vessel into the first container. The method 600 further includes a fourth step 610 of removing the first container from the vessel. The method 600 includes a step 612 of placing a second container to be filled in a filling relationship to the vessel.

Figure 1:
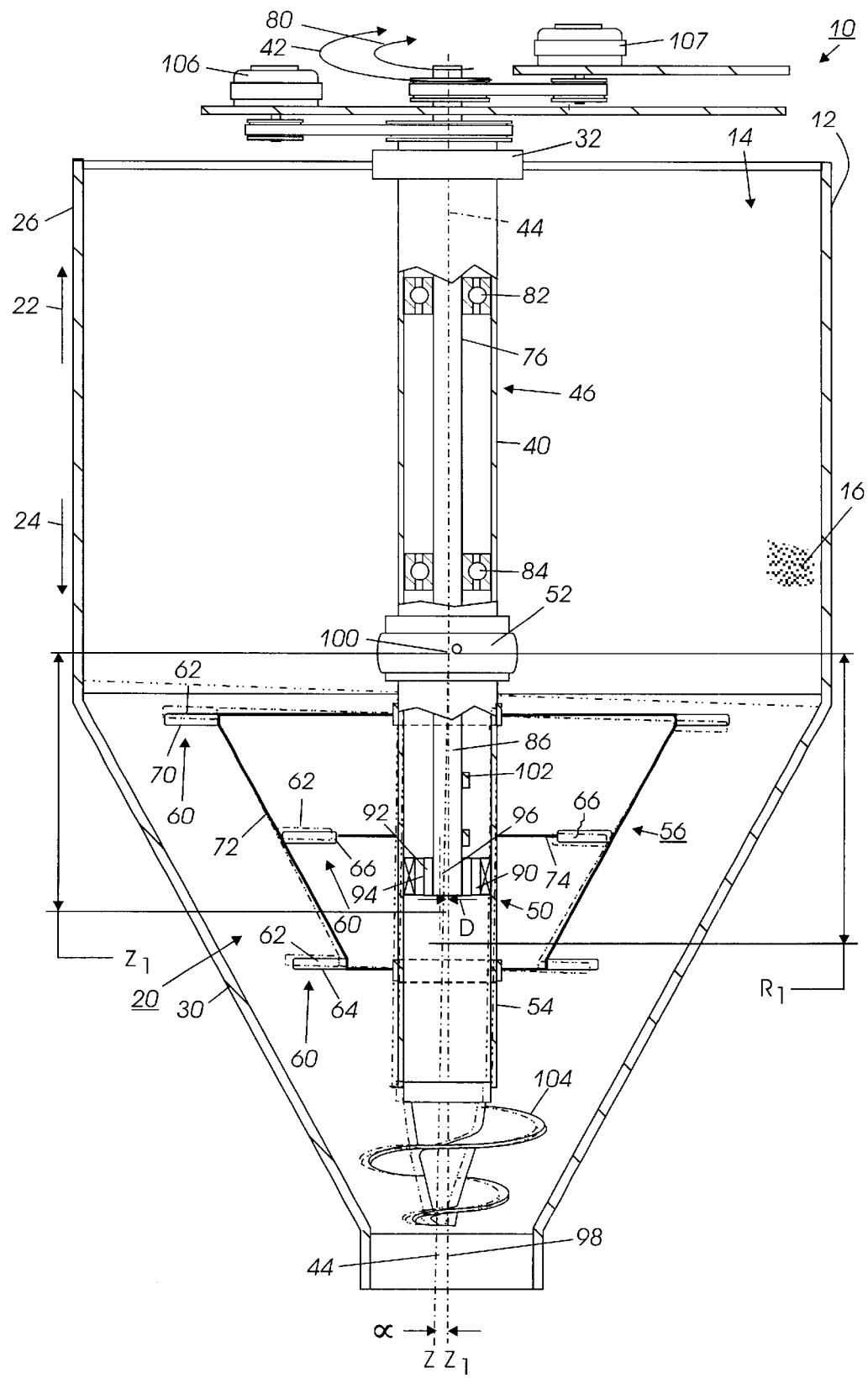
FIG. 1 is a cross-sectional schematic view of a vibratory filler for developer material for use in the vibrofluidization powder filling process of the present invention.

While the process of powder filling with vibroliquification which may be also called vibrofluidization or liquefaction may be utilized with any device capable of properly exciting the powder particles, for example and referring to FIG. 1, a first embodiment of the vibratory filler 10 for developer material to be discussed is shown. A hopper 12 with a supply of toner 16 is connected to a fill tube 105 (see FIG. 2) which directs toner 16 into a toner container (not shown).

The vibratory filler 10 serves to "liquefy' and control the flow of powders such as xerographic toners. It should be appreciated that the invention is equally well suited for any powder, for example cement, flour, cocoa, herbicides, pesticides, pharmaceuticals, etc. The applicants have found that when the volume of a given mass of toner is caused to be increased by 10 to 15%, the friction between toner particles is reduced by approximately a factor of 40. The additional volume for the particular mass of toner is comprised of air. The air penetration between the particles decreases the friction between the particles. This reduced friction causes the transition of the toner from a powder state to a liquid-like state. In fact, the toner flows as though it was water.

FIG. 1 depicts only one embodiment of a device that is capable of increasing the volume of the toner to improve its flow properties. This increase in volume to cause the dramatic improvement in (by a factor of 40) is known as liquefaction.

The applicants have found that increasing the volume of toner 12 to 15 percent requires that the toner particles be accelerated in a direction opposed to that of the gravitational pull. The toner must thus be accelerated a upwardly direction.

Applicants have found that an acceleration of approximately between one to two times the acceleration of gravity (32 to 64 feet per second squared) is sufficient to permit the liquefaction of toner.

Applicants have also found that subjecting the toner particles to a cyclic or reciprocating force which has a frequency with a range of 20 Hertz to 70 Hertz is effective in creating the liquefaction of the toner. Applicants have found that a Frequency of 50 Hertz to be particularly effective in creating liquefaction.

Applicants have found that when subjecting the toner to a cyclic or reciprocating force, the amplitude of the acceleration is preferably in excess of approximately 1 millimeter.

Referring again to FIG. 1, a vibratory filler 10 is shown. The vibratory filler 10 includes a hopper 12 including a chamber 14 within the hopper 12 for storing a supply of toner 16. The hopper 12 may be made of any suitable, durable material which is chemically non-reactive with the toner 16, for example stainless steel.

An accelerating device 20 is located at least partially within the chamber 14. The accelerating device 20 is utilized to accelerate the toner 16 in a direction of arrow 22 opposed to direction 24 of gravity. It should be appreciated that the accelerating device 20 may be any device capable of accelerating the particles into the direction of arrow 22 with an acceleration of between approximately one or two times the acceleration of gravity (1 to 2 G's) or 32–64 feet per second square The accelerating device 20 as shown in FIG. 1 is mounted to the hopper 12. The hopper 12 may have any suitable shape. For example, as shown in FIG. 1, the hopper may have an upper portion 26 with a generally cylindrical shape and a lower portion 30 with a conical shape.

The accelerating device 20 may be secured to the hopper 12 in any suitable manner. For example, as shown in FIG. 1, the accelerating device 20 maybe secured by upper bearing 32. To provide for rotation of auger 104, the acceleration device 20 includes a housing 40, preferably in the form of a tube. The housing 40 is rotatably mounted by bearing 32 to hopper 12. The housing 40 is preferably rotatable in the direction of arrow 42 about axis 44.

The housing 40 preferably rotates at an angular velocity ft. The velocity $\omega_O$ is preferably approximately 5 to 45 revolutions per minute, with 20 revolutions preferred. The housing 40 preferably includes a rigidly mounted upper portion 46 supported by upper bearing 32. The housing 40 also includes a lower portion 50. The lower portion 50 is mounted to the housing upper portion 46 by a flexible coupling 52. The coupling 52 may be any suitable, durable, commercially available coupling. The lower portion 50 rotates at the same rotational velocity $\omega_O$ as the upper portion 46. However, the lower portion 50 is permitted by the flexible coupling 52 to pivot about centerpoint O of the coupling 52. In the theory of gyroscopes the motion is called regular precession.

The housing 40 may have any suitable shape and can be made of any suitable, durable material which is non-reactive with the toner 16. For example, the housing 40 may be made from stainless steel. The upper portion 46 and the lower portion 50 of the housing 40 is preferably in the form of a hollow tube. The tube has a sufficient diameter and wall thickness to provide ample strength for this application.

To provide a surface for the upward acceleration of the toner 16 in the direction of arrow 22, the vibratory filler 10 includes an agitator 56 extending outwardly from periphery 54 of the lower portion 50 of the housing 40. The agitator 56 may have any suitable shape and be made of any suitable, durable material that is chemically non-reactive with the toner 16. For example, the agitator 56 may be made of stainless steel.

The agitator 56 preferably includes a feature 60 preferably in the form of rings to provide a surface 62 for the upward acceleration of the toner 16.

The rings 60 may extend directly from the periphery 54 of lower portion 50, but preferably, to enhance their effectiveness, the rings 60 are positioned a distance from the periphery 54. It should be appreciated that a single ring 60 may be sufficient for the invention, preferably, however, a plurality of rings are included with agitator 56. The rings 60, as shown in FIG. 1, include a lower ring 64, a central ring 66 and an upper ring 70. The rings 60 are interconnected in any suitable fashion. For example braces 72 interconnect the lower ring 64, Central ring 66, and the upper ring 70. The rings 60 are spaced from the periphery 54 by spokes 74 extending outwardly from periphery 54 to the rings 60.

The agitator 56 is secured to housing 40 in any suitable fashion, for example by an interference fit or by welding to the lower portion 50. The agitator 56 thus rotates in the direction of arrow 42 at a rotational speed $\omega_o$ with upper portion 46 of housing 40.

A shaft 76 is located within housing 40. The shaft 76 rotates in a direction of arrow 80 at a rotational speed $W_s$ of approximately 3,000 revolutions per minute. The shaft 76 rotates about axis 44 of housing 40 and is concentric with upper portion 46 of housing 40. The shaft 76 generally extends the length of upper portion 46, through flexible coupling 52 and through lower portion 50 of the housing 40. The shaft 76 is supported within upper portion 46 of housing 40 by upper bearing 82 and lower bearing 84. The bearings 82 and 84 maybe any suitable bearings, for example commercially available ball bearings. The shaft 76 includes a lower portion 86 which extends within the lower portion 50 of housing 40 with the lower portion 86 rotating about axis 44.

The lower portion 50 of housing 40 is supported at its upper end by the flexible coupling 52. The lower portion 50 is also supported at a position below coupling 52 by shaft 76. A bearing 90 is used to support the lower portion 50 below coupling 52. The bearing 90 is preferably a commercially available double row spherical ball bearing.

An eccentric bushing 92 is secured to lower portion 86 of shaft 76 at bearing 90. The eccentric bushing has a cylindrical bore which may be fitted to shaft 76 and an outer periphery 94 with a centerpoint 96 which is spaced from axis 44 a distance D. The outer periphery 94 of bushing 92 is fitted to bearing 90. Bearing 90 is secured to lower portion 50 of housing 40 and to shaft 76 any suitable fashion, but preferably by an interference fit.

The lower portion 50 of housing 40 and the agitator 56 thus rotate about centerline axis 98. The centerline axis 98 is defined by centerpoint 100 of the flexible coupling 52 and by centerpoint 96 of bushing 92.

The axis 98 of the agitator 56 assumes the motion similar to the motion of the axis of a freely spinning top or follows or traces the surface of the cone defined by center axis 44 and axis 98 which nutates about around center axis 44. The agitator 56 thus accomplishes a complicated motion which in gyroscope theory is called "regular precession". The agitator slowly rotates about axis 98 with an angular velocity $\omega_O$ of 5 to 45 RPM. The axis 98 processes or nutates around axis 44 of shaft with an angular velocity of approximately 3000 RPM. The rotation of the shaft at 3,000 RPM is identical to a rotation of 50 revolution per second. Thus the shaft causes the agitator 56 to oscillate at 50 cycles per second or 50 Hertz.

The amplitude of the oscillation in the vertical direction of the agitator 56 and the lower portion 50 of the housing 40 at any point in the mechanism may be defined by Formula:

$$A_i = R_i \tan \alpha$$

where:
$A_i$ is the amplitude of the oscillation at any point in the mechanism in the vertical direction
$R_i$ is the length of the perpendicular from that point in the mechanism to the axis 44
$\alpha$ is the angle between axis 98 and axis 44

Further, the acceleration of the oscillations may be defined by the formula:

$$Am = A_i \omega_s^2 \tan \alpha$$

where:
Am is the acceleration of the oscillations in the vertical direction;
$A_i$ is the amplitude of the oscillations in the vertical direction;
$\omega_s$ is the angular rotation speed of the shaft 76 of the vibrator.

The vertical oscillations of the upper surface 62 of the rings 60 creates upward acceleration of the toner 16, creating the toner liquefaction. The liquefied area expands outwardly from the rings 60 over time causing all the toner 16 within the entire hopper 12 to become liquefied.

To reduce the vibration level of the shaft, the shaft is preferably dynamically balanced by balance weights 102 positioned on the shaft opposed to the eccentric bushing. The mass and position of the weights 102 is chosen to balance the shaft to an acceptable level.

To regulate the flow of toner toward fill tube 105 (see FIG. 2) position at lower end of lower portion 30 of hopper 12, an auger 104 is preferably attached to the lower end of lower portion 50 of housing 40 and rotates therewith. The auger may have any suitable shape and be made of any suitable, durable material that is non-reactive with the toner 16. For example, the auger 104 may be made of stainless steel. The auger may have a conical shape as shown and be positioned above fill tube 105.

The housing 40 may be rotated in any suitable manner, for example by a housing electric motor 106. The shaft 76 is likewise rotated by any suitable manner, for example by a shaft electrical motor 107. It should be appreciated that the motors 106 and 107 may be replace by a common motor and a transmission.

To regulate the flow of toner from the hopper 12, a valve 108 (see FIG. 2) is preferably positioned within fill tube 105. The valve 108 may be any suitable, durable valve capable of regulating the flow of toner. Any mechanical valve of proper size and shape to handle the flow rate when open may be used, for example a mechanical gate valve. One particular valve 108 which is effective in regulating toner and, in particular in selectively opening and closing the flow of magnetic toner is an electromechanical toner valve which is disclosed in U.S. patent application Ser. No. 08/540,993, the relevant portions thereof incorporated herein by reference.

Figure 2:
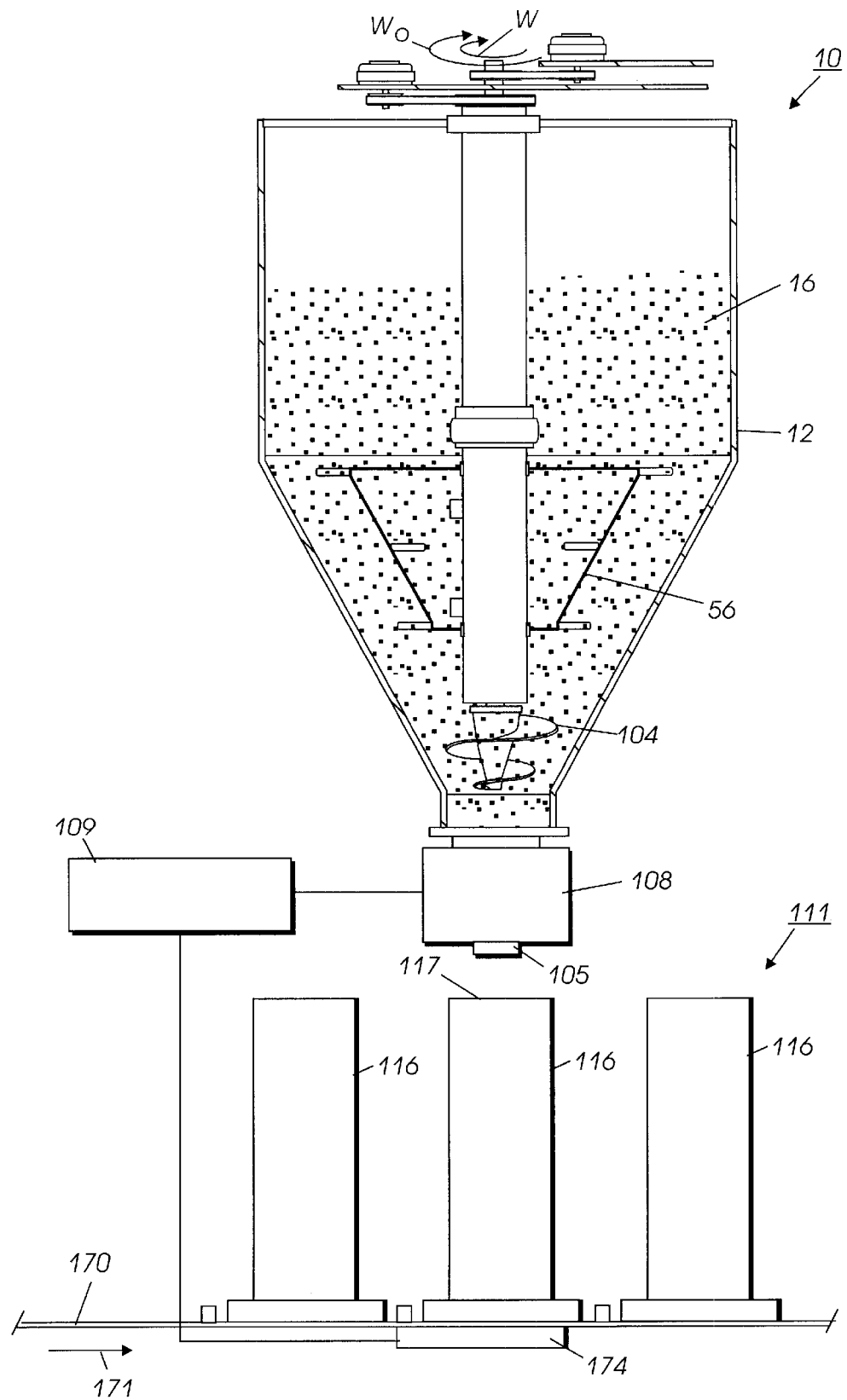
FIG. 2 is a side view of a container filling system incorporating the FIG. 1 vibratory filler for developer material.

Referring now to FIG. 2, the vibratory filler 10 is shown installed in the hopper 12 and positioned over an automatic high speed production filling line 111. A conveyor 170 advances a container 116 to be filled in the direction of arrow 171 to a position with the toner opening 117 of the container 116 directly below fill tube 105. A lifting mechanism 174 raises the container 116 into engagement with the fill tube 105. The agitator 56 advances toner 16 toward auger 104. When a container 116 is to be filled, a controller 109 signals the valve 108 to be energized. The valve 108 permits the toner to pass to fill tube 105. The toner 16 advances into container 116 and fills the container. The lifting mechanism 174 then lowers the container 116 and the conveyor 170 advances another container 116 into filling position. It should be appreciated that, alternatively, depending on the size of the container opening, the toner may be dispensed directly from the valve 108 into the container opening. The direct dispensing of the toner from the valve into the container would obviate the need for a lifting mechanism and permit more rapid filling. A filling process which has clearance between the valve and the container would require suitable dust control.

Figure 3:
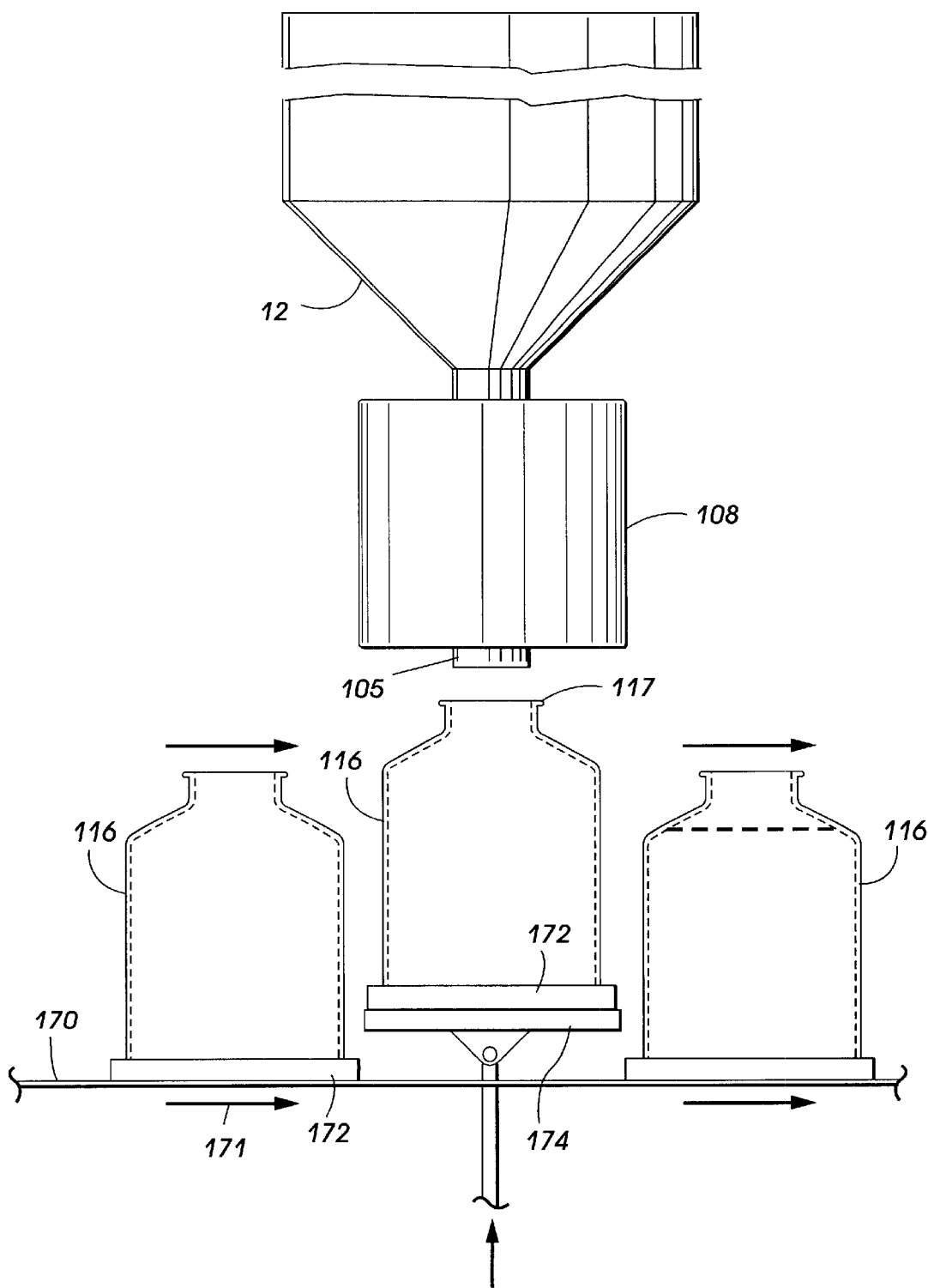
FIG. 3 is a side view of the container filling system of FIG. 2 for use with the vibratory filler for developer material of FIG. 1 prior to filling the container.

FIG. 3 depicts a side view of moving containers 116 along an indexing conveyor 170 relative to the fill tube 105, which is relevant to all of the embodiments. Each of the containers is positioned in a carrying device 172, also known as a puck. Each puck is specially designed and built for each type of toner container, the puck allowing for different container widths and heights. A puck is used so that the same conveying and lifting system can be used with varying toner container types. When the container is in position under the fill tube the lifting mechanism 174 pushes the puck with the container in it up until the lifting mechanism is fully extended. When the lifting mechanism is fully extended, the container is in the proper filling relationship with the fill tube. It should be appreciated that the container may be placed on a conveyor without a puck, particularly if the filling line is a dedicated line and if the container has a self-supporting shape that would not to permit the container to easily tip.

Figure 4:
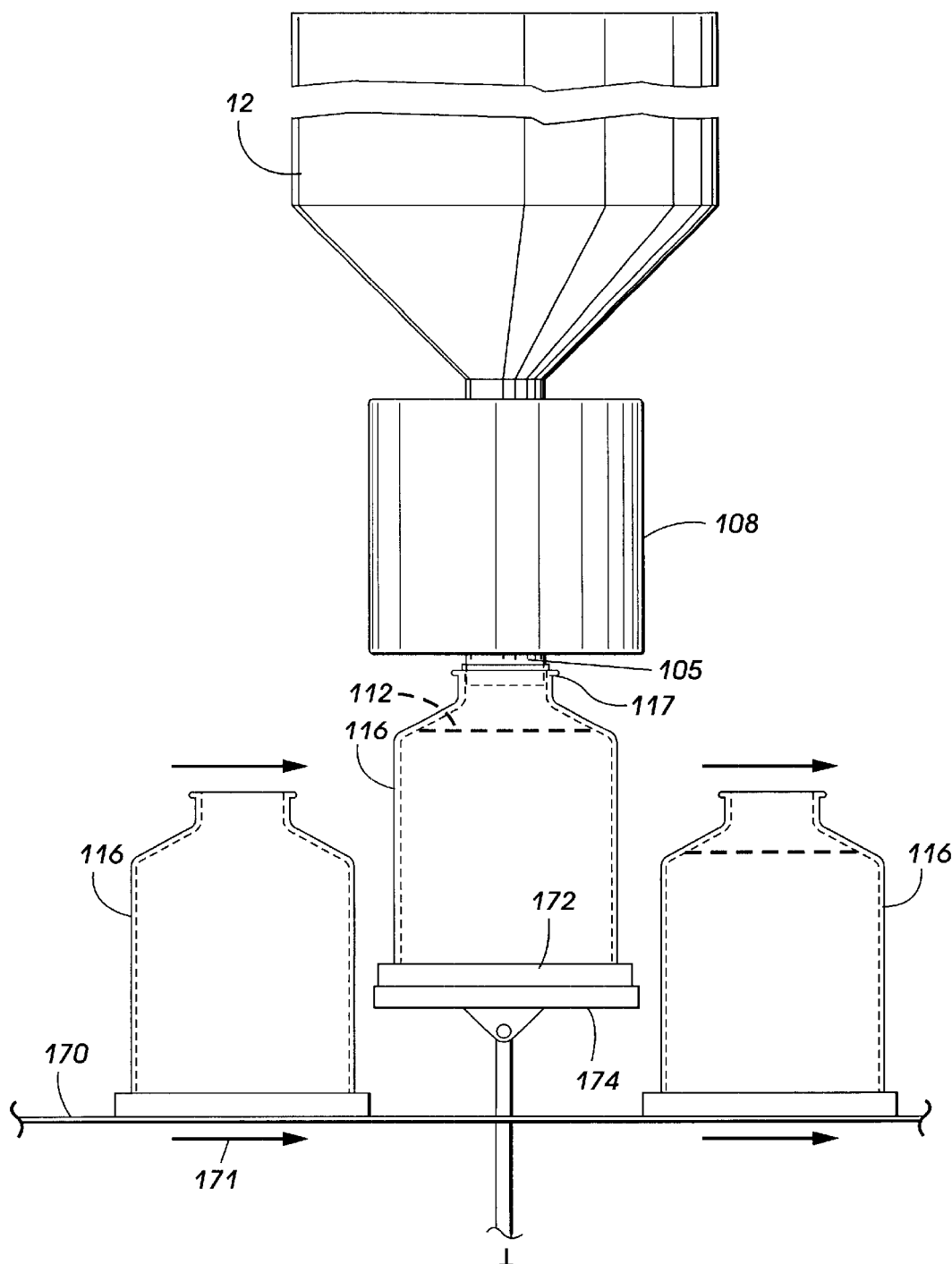
FIG. 4 is a side view of a container filling system of FIG. 2 for use with the vibratory filler for developer material of FIG. 1 after the container is filled.

FIG. 4 shows the container in the proper filling relationship to the fill tube, the container opening 117 receiving the end of the fill tube 105. The amount of toner loaded in the container is predetermined based on the size of the container, the toner flow rate is controlled by the parameters of the acceleration device 20 and the toner is permitted to flow for a sufficient time to fill the container. The flow is stopped by any suitable method such as a mechanical valve, for example a gate valve, or if the toner is magnetic, by an electromagnetic valve as described in U.S. patent application Ser. No. 08/540,993, which is assigned to the same assignee as the present invention, incorporated herein by reference in its entirety. Once the predetermined amount of toner passes through the fill tube the container is filled and the filling process is begun again so that as the container is moved from the fill tube, the toner is held in place with a toner plug. The fill tube 105 is sized so that it is slightly smaller than the toner container opening 117.

Figure 5:
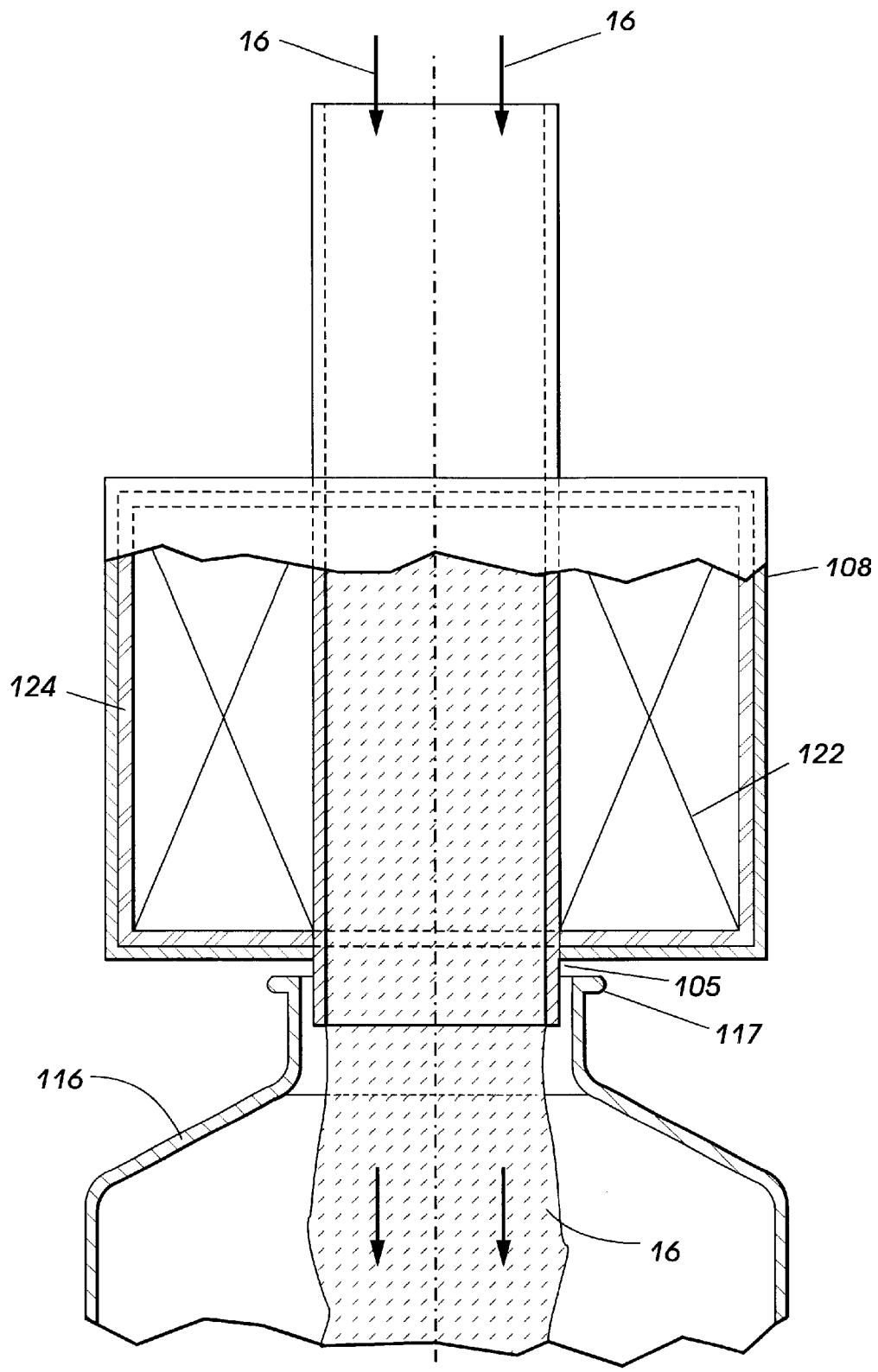
FIG. 5 is a cross-sectional schematic view of an open channel radial magnetic field toner filling valve for use with the container filling system of FIG. 2.

Referring now to FIG. 5, an electromagnetic toner valve 108 as described more fully in U.S. patent application Ser. No. 08/540,993 is shown. Fill tube 105 for feeding toner 16 into a toner container 116 is shown. The fill tube is sized so that it is slightly smaller than the toner container filling opening 117. The electromagnetic toner valve 108 has a solenoid comprised of windings 122 located on the fill tube through which the toner 16. The windings are preferably surrounded by insulation 124 for safety and cleanliness purposes. When the toner valve is under power, the solenoid will generate a magnetic field sufficient to freeze or stop all toner particles inside the tube including those on the auger.

Figure 6:
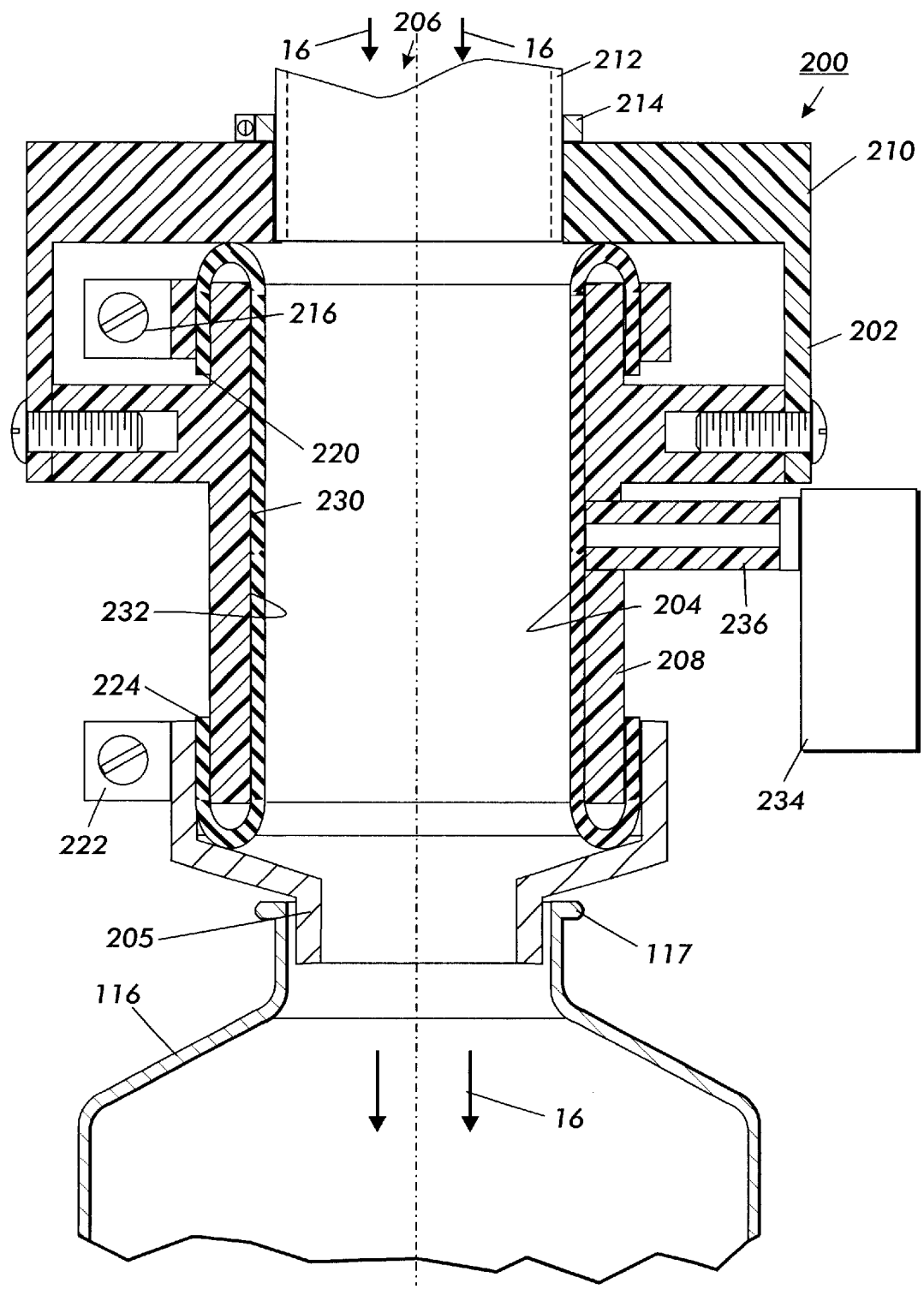
FIG. 6 is a cross-sectional schematic view of a pneumatic toner filling valve for use with the container filling system of FIG. 2 with the valve in the opened position.

While the use of the electromagnetic valve of as described above may be well suited for use with magnetic toner, for non-magnetic toner, other types of valves such as mechanical valves are more well suited for filling the container. Referring now to FIG. 6, one such mechanical valve is in the form of pneumatic valve 200. The pneumatic valve 200 includes a body 202 as well as a pliable member 204. The body 202 supports and is operably connected with the pliable member 204. The pliable member 204 expands and contracts to block an aperture 206 formed within the body 202.

The body 202 may have any suitable shape capable of supporting the pliable member 204. Likewise, the body 202 may be made of any suitable, durable material, i.e. a metal or a durable plastic which is not chemically reactive with the powder to be filled into the container. For example, the body 202 may be made of stainless steel.

For simplicity, the body 202 may have a generally cylindrical shape. The body 202 includes a support portion 208 for supporting the pliable member 204 and an adapter 210 for adapting the pneumatic valve 200 to inlet conduit 212. While the adapter 210 may be integral with the body 202, preferably, adapter 210 and the body 202 are separate components.

The inlet conduit 212 may have any suitable shape and may be in the form of a plastic or a metal tube. The inlet conduit 212 receives toner from a hopper 12 (see FIG. 5) and transports toward the pneumatic valve 200. The inlet conduit 212 is connected to the adapter portion 210 by any suitable method such as by welding, gluing or by a connector. For example, as shown in FIG. 6, the inlet conduit is connected to adapter 210 by connector 214 in the form of a clamp.

The support portion 208 of the body 202 may have any suitable shape capable of supporting the pliable member 204. For example, the support portion 208 may be in the form of a cylindrical tube. The pliable member 204 is connected to the support portion 208 in any suitable manner. For example, the pliable member 204 may be, as shown in FIG. 6, connected by a first clamp 216 located at first end 220 of the pliable member 204 and a second clamp 222 located at second end 224 of the pliable member 204. The pliable member 204 is connected to the clamps 216 and 222 by any suitable method. For example, as shown in FIG. 6, the pliable member 204 is expanded and rolled outwardly at the first and second ends 220 and 224 thereof, such that the ends 220 and 224 of member 204 may be clamped to the first and second clamps 216 and 222, respectively, as shown in FIG. 6.

The pliable member 204 may be made of any suitable durable material which is pliable and may be positioned into a first position in which the pliable member 204 blocks the aperture 206 and into a second position in which the pliable member 204 permits passage of toner through the aperture 206. For example, the member 204 may be an elastic member made of an elastic material, i.e. a rubber or synthetic rubber material. The pliable member 204 may be made of latex.

The pliable member 204 may have any suitable shape capable of being positioned into a first closed and a second opened position. For example and for simplicity, particularly when the support portion 208 of the body 202 is in the form of a hollow cylinder, the pliable member 204 may be in the form of a hollow cylinder. As shown in FIG. 6, the pliable member 204 may have a relaxed position in which the member 204 is positioned near inner wall 230 of the support portion 208 of the valve 200.

The toner 16 may be dispelled directly from the support portion 208 of the valve 200 into the container 116 to be filled. Alternatively, as shown in FIG. 6, in order to minimize the spilling of toner and to minimize the occurrence of dust, a fill tube 205 may be positioned between the valve 200 and top 117 of the container 116. The fill tube 205 may have a diameter slightly smaller than the opening of the top 117 of the container 116 such that the toner exiting the support portion 208 of the valve 200 enters directly into the container 116. The fill tube 205 may be made of any suitable durable material that is not chemically reactive with the toner 16. For example, the fill tube 205 may be made of a plastic or a metal, i.e. stainless steel. The fill tube 205 may be connected to the support portion 208 by any suitable method, i.e. a clamp or welding.

The pliable member 204 may be positioned from the open position as shown in FIG. 6 to a closed position as shown in FIG. 2 and in FIG. 3 by any suitable method. For example, the member 204 may be expanded inwardly by adding air pressure to chamber 232 formed between the pliable member 204 and the inner wall 230 of the valve 200. Adding pressure within the chamber 232 will cause the member 204 to expand inwardly. Pressure may be applied to the chamber 232 in any suitable method, i.e. by air, an inert gas or by means of a hydraulic fluid.

For example, as shown in FIG. 6, the chamber 232 may be in communication with a pressure source 234. The pressure source 234 may be for example a supply of compressed air or, as shown in FIG. 6, may be in the form of industrial shop air having a pressure of, for example, 80 to 120 psi. The pressure source 234 is connected to the chamber 232 by any suitable method, for example, by fitting 236.

Figure 7:
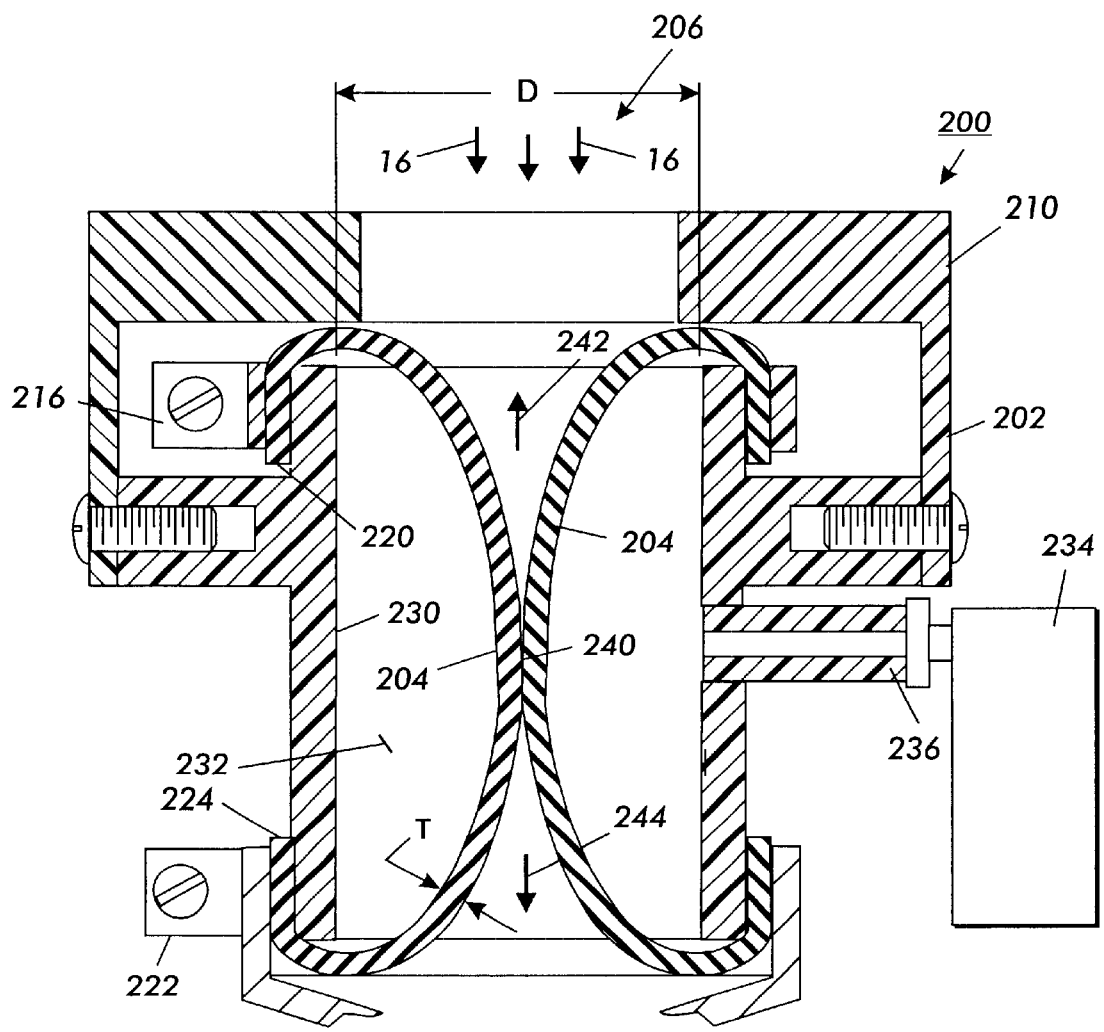
FIG. 7 is a cross-sectional schematic view of the pneumatic valve of FIG. 6 with the valve in the partially closed position.

Referring now to FIG. 7, the pliable member 204 is shown in a partially expanded position as pressure applied to the chamber 232 by pressure source 234. Since the pliable member 204 is made of a pliable material, the pressure source within the chamber 232 causes the pliable member 204 to expand inwardly in an arcuate manner. The central portion of the pliable member 204 thus compresses and blocks the aperture 206 at a central position of the pliable member 204. This method of blocking the aperture 204 is very gentle on toner. It is only a tiny portion of the toner is contacted at the central portion or contact area 240 of the pliable member 204. As the pliable member 204 continues to expand, the toner 16 is moved outwardly from the first contact area 240 in the direction of arrow 242 upwardly for toner positioned above the contact area 240 and downwardly in the direction of arrow 244 for toner positioned below the contact area 240.

Applicants have found that for a pliable member 204 having been made of a latex material and having a thickness T of approximately 0.005 inches and for a aperture 206 defined by a diameter D of approximately 1.5 inches, a gage pressure from the pressure source 234 of approximately two to ten psi is sufficient to actuate the valve 200 within a few milliseconds.

Figure 8:
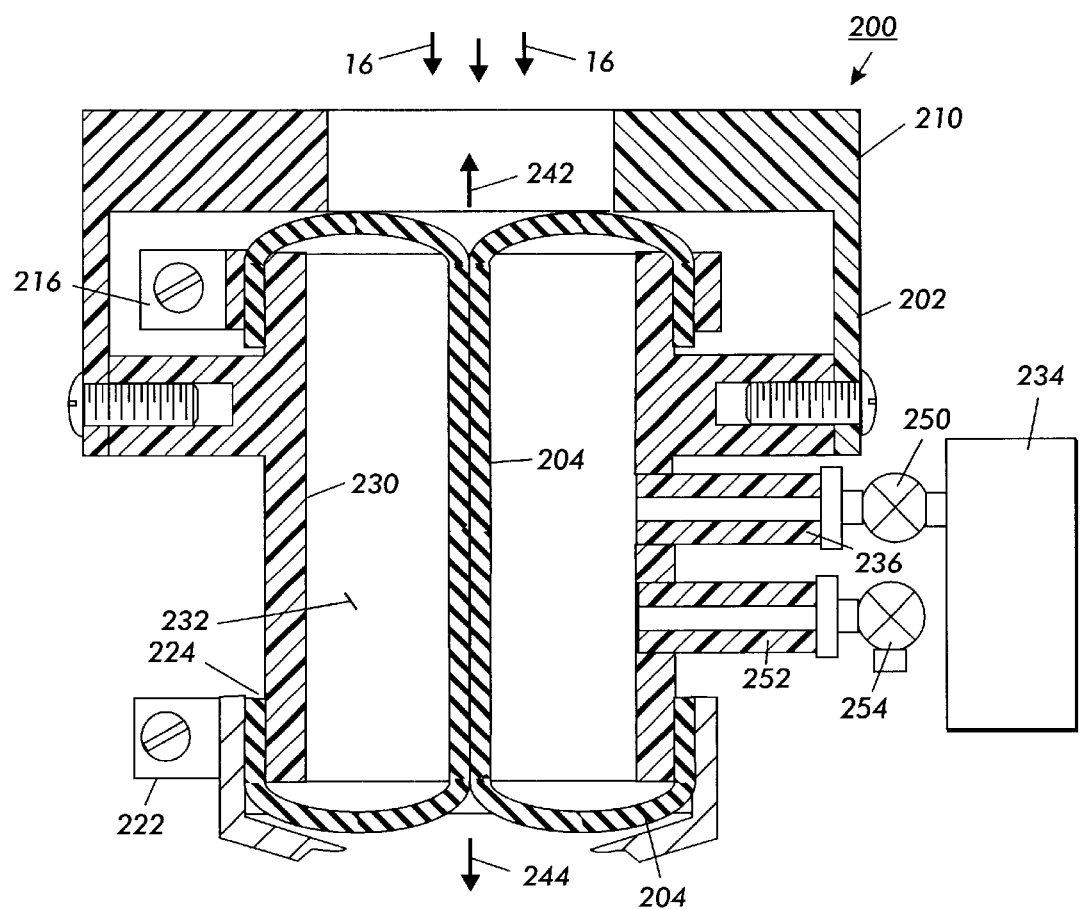
FIG. 8 is a cross-sectional schematic view of the pneumatic valve of FIG. 6 with the valve in the fully closed position.

Referring now to FIG. 8, the member 204 is shown in the fully closed position. It should be appreciated that the valve 200 securely prevents the flow of toner through the aperture 206 of the valve 200. All toner trapped within the valve 200 is gently moved in the direction of arrows 242 and 244 as the member 204 is expanded inwardly, thus gently removing the toner 16 from the valve 200. The air within the pressure source 234 may be permitted to enter into the chamber 232 by any suitable method. For example, the pressure source 234 may be separated from fitting 236 by a pressure source valve 250. The valve 250 may be any suitable valve, i.e. a butterfly, gate or any other type of valve capable of quickly opening and closing, thus controlling the flow of air from the pressure source 234.

Referring again to FIG. 8, when it is desired to have the valve 200 reopened or to have the aperture 206 permit the toner 16 to pass therethrough, the elasticity of the pliable member 204 may be utilized to permit the pliable member 204 to return to its relaxed position adjacent the inner wall 230 of the valve 200. To accomplish this, the pressurized air within the chamber 232 is removed. This may be accomplished in any suitable manner, i.e. as shown in FIG. 8, the valve 250 may be closed removing the pressure source 234 from communication with the chamber 232. In addition, a vent 252 may be placed in communication with the chamber 232. The vent 252 is vented to atmosphere and includes a venting valve 254 to close the vent when the chamber 232 is pressurized and to open the vent when the evacuation of the chamber 232 is required.

Figure 9:
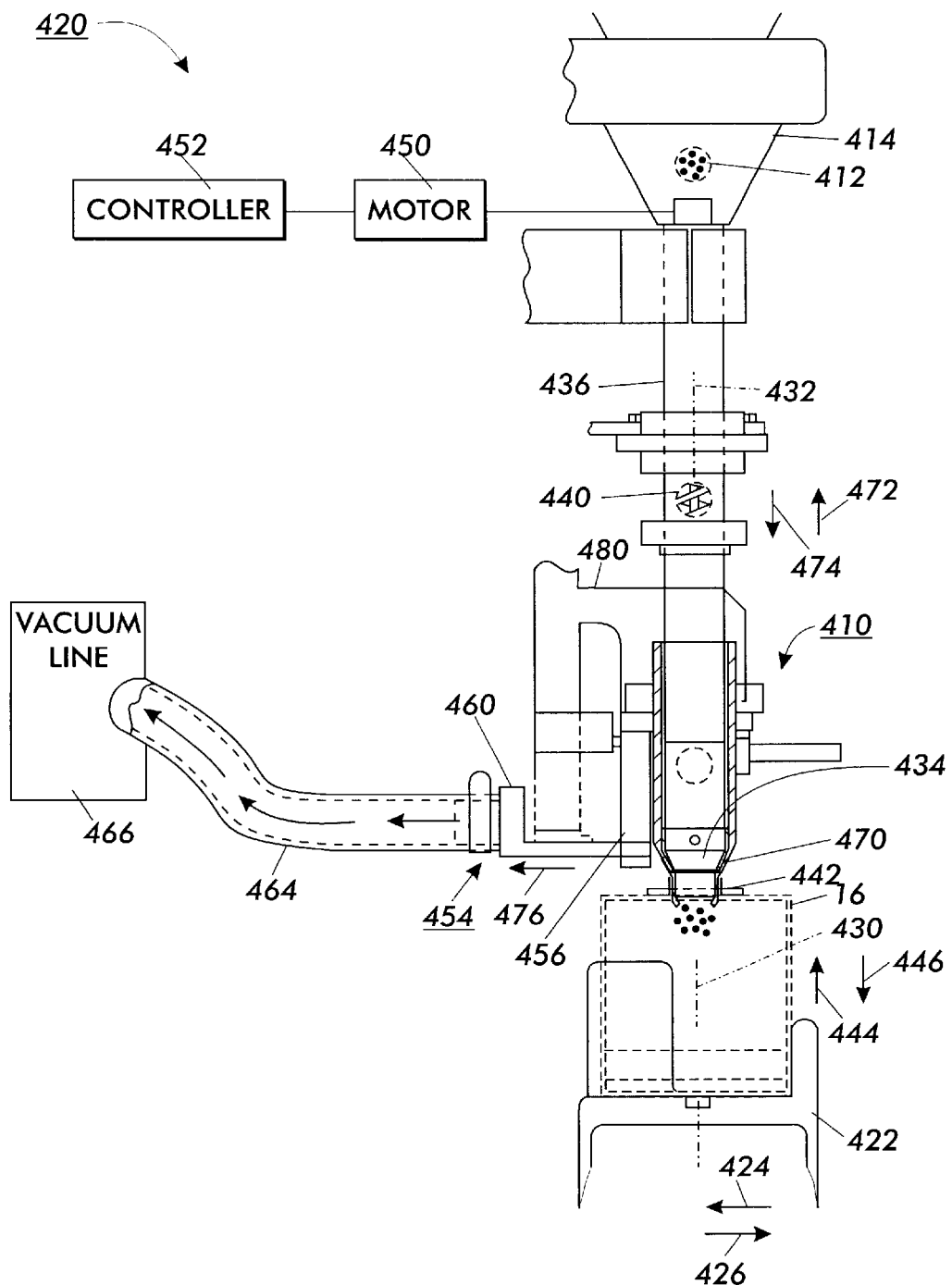
FIG. 9 is an elevational view of a container filling system for use in the vibrofluidization powder filling process of the present invention partially in section utilizing the deflector of FIG. 11 showing the deflector in use to disperse the developer material with the filling system in the filling position.

To further assist in the complete filling of the container 16, the vibrofluidized powder filling process of the present invention may, referring now to FIG. 9, include a powder filling assisting apparatus in the form of, for example, deflector 410. The powder filling assisting apparatus 410 is used to convey powder 412 in the form of toner for use in a copier or printer from a hopper 414 to the container 16. The powder filling apparatus 410 is mounted to filling line 420 preferably to permit for the filling of large production quantities of containers 16, the container 16 is preferably mounted to a carrying device 422. The device 422 is movable in the direction of either arrow 424 or 426. The carrying device 422 serves to position container centerline 430 in alignment with apparatus centerline 432.

The powder filling assisting apparatus 410 includes a nozzle 434 which is used to direct the powder 412 into the container 16. The nozzle 434 is connected to the hopper 414 by means of a conduit 436 preferably in the form of a hollow tube or funnel.

As shown in FIG. 9, the hopper 414 is positioned above the container 16 whereby gravity will assist in the flow of powder 412 toward the container 16. To optimize the flow of powder 412 toward the container 16, the powder filling apparatus 410 further includes a conveyor 440 positioned at least partially within the conduit 436 for assisting in the flow of the powder 412. The conveyor 440 is preferably in the form of a spiral conveyor or auger. For example, the auger 440 may be in the form of a spiral shaped auger.

Preferably, the nozzle 434 is insertable into opening 442 of the container 16. The insertion of the nozzle 434 in the opening 442 may be accomplished in any suitable method. For example, the carrying device 422 and, consequently, the container 16 may be movable upward in the direction of arrow 444 for engagement with the nozzle 434 and downward in the direction of arrow 446 for disengagement from the opening 442. The upward and downward motion of the device 422 and the container 16 permits the container 16 to be indexed in the direction of arrows 424 and 426.

To permit the filling of a number of containers 16, the flow of powder 412 from the hopper 414 must be halted during the indexing of a filled container 16 from the fill position and during the indexing of the unfilled container 16 toward the filling position. As shown in FIG. 9, the flow of powder 412 may be halted by the stopping of auger 440 within the conduit 436. The auger 440 may be rotated by any suitable method, i.e. by motor 450 operably connected to the auger 440. The motor 450 is connected to a controller 452 which sends a signal to the motor 450 to stop the rotation of the auger 440 during indexing of the carrying device 422. It should be appreciated, however, that the flow of powder 412 through the conduit 436 may be further controlled by the use of a valve (not shown).

Preferably, provisions are made to assure that the filling line 420 is free from airborne powder 412 which may escape between the nozzle 434 and the opening 442 of the container 16 during the filling operation and in particular during the indexing of the carrying device for presenting an unfilled container 16 to the powder filling apparatus 410. A clean filling system 454 is shown in FIG. 9 for use with the apparatus 410. The clean filling system 454 preferably includes housing 456. The housing 456 is secured to filling line 420 as well as to the conduit 436.

The housing 456 may serve several purposes. For example, the housing 456 may be used to support slide 460. Slide 460 is connected to a tray 461 which slidably is fitted between the nozzle 434 and the opening 442. The tray 461 may have any suitable form and, as shown in FIG. 9 may be in the form of a toner drip plate. The tray 461 has a first position in which the tray 461 prevents the powder 412 from exiting the nozzle 434. In this extended position, the tray 461 prevents the spilling of powder 412 during the indexing of the containers 16. The tray 461 also has a second retracted position for permitting the powder 412 to flow into the container 16 during filling. The housing 456 preferably also provides a second purpose, namely, to support the conduit 436 and the nozzle 434.

Also, the housing 456 surrounds the nozzle 434 and provides a cavity or chamber 462 which is sealed when the tray 461 is in its closed position. The chamber 462 preferably is kept at a vacuum. The chamber may be maintained at a vacuum in any suitable fashion, e.g. the chamber 462 may be connected by toner dust vacuum line 464 to vacuum source 466. The vacuum source 466 may be in the form of a toner recovery booth.

The housing 456 also may preferably provide an additional function. The housing 456 serves as a registration guide for guiding the nozzle 434 into the opening 442. As shown in FIG. 9, the housing 456 includes a chamfered end 470 which as the container 16 moves in the direction of arrow 444, contacts the opening 442 to register and align the powder filling assisting apparatus 410 with the container 16. Preferably, the housing 456 is slidably mounted to the conduit 436 such that the housing 456 may move upwardly in the direction of arrow 472 and downwardly in the direction of arrow 474. It should be appreciated that the sliding motion of the housing 456 may be accomplished by gravity or by springs as well as by a motor or other mechanism. For example, the housing 456 may be moved upwardly in the direction of arrow 472 by the container 16 moving upwardly in the direction of arrow 444. The nozzle 434, thereby, enters into the opening 442 permitting filling.

Concurrently with the raising of the container 16 to engage with the nozzle 434, the tray 461 is moved to the left in the direction of arrow 476 to permit the powder 412 to flow through the nozzle 434 and into the container 16. It should be appreciated that the tray 461 may be actuated in any manner, for example, by means of a motor or other mechanism, but, as shown in FIG. 9, the tray 461 is preferably operated by a cam mechanism 480 interconnected to the housing 456 such that when the housing 456 moves in the direction of arrow 472, the tray 461 moves in the direction of arrow 476 opening the chamber 462 to communication with the container 16.

FIG. 9 shows the powder filling assisting apparatus 410 in the container up position to enable filling of the container 16. The nozzle 434 is positioned in the opening 442 of the container and the tray 461 is retracted in the position of arrow 476 to permit the flow of toner 412.

Figure 10:
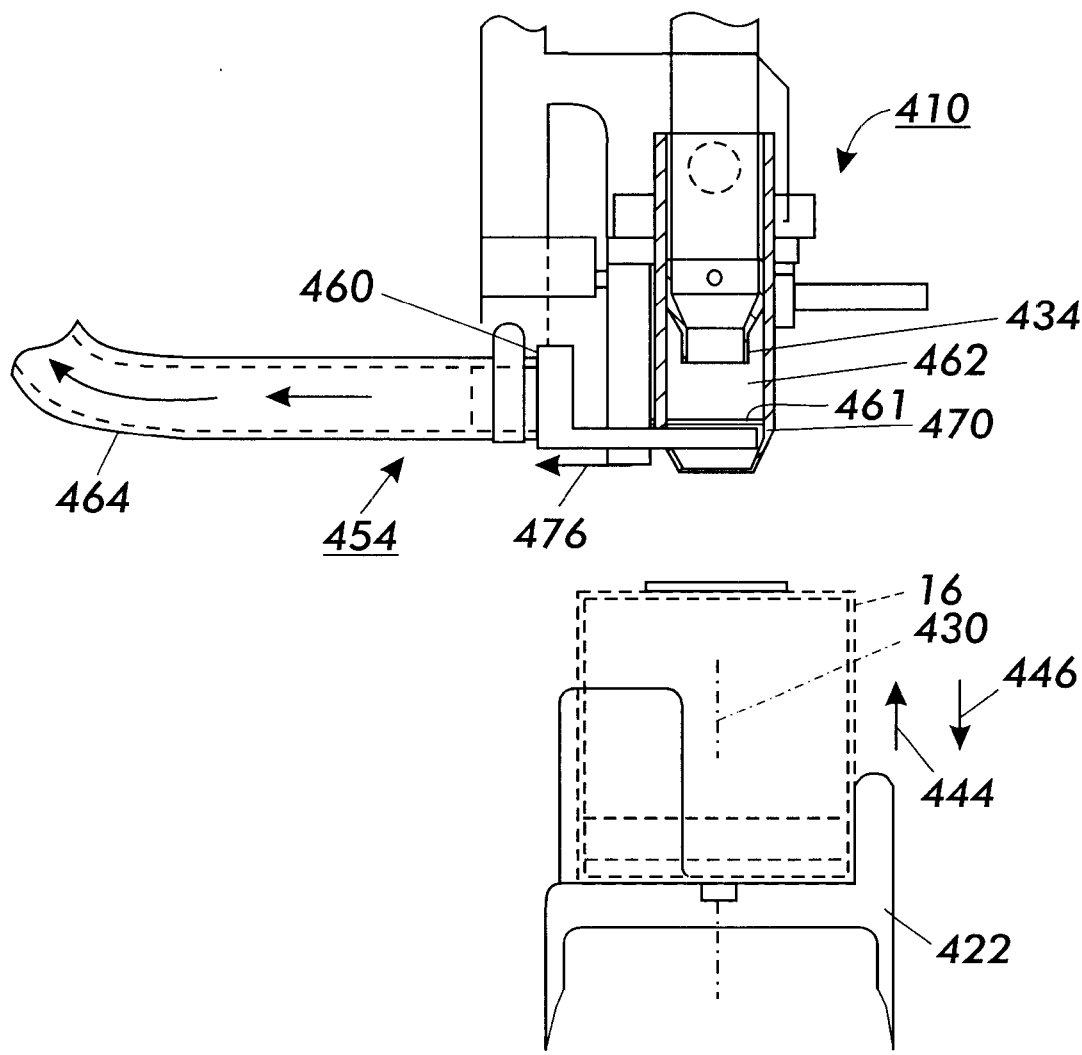
FIG. 10 is a partial elevational view of the container filling system of FIG. 2.

Referring now to FIG. 10, the powder filling assisting apparatus 410 is shown with in the container down position to enable indexing of the carrying device 422. The carrying device 422 indexes the filled container out of the fill position and indexes the unfilled container into the fill position. The nozzle 434 is removed from the opening 442 of the container 16 in this position. The tray 461 is extended into the chamber 462 to catch any dripping toner residue.

Figure 11:
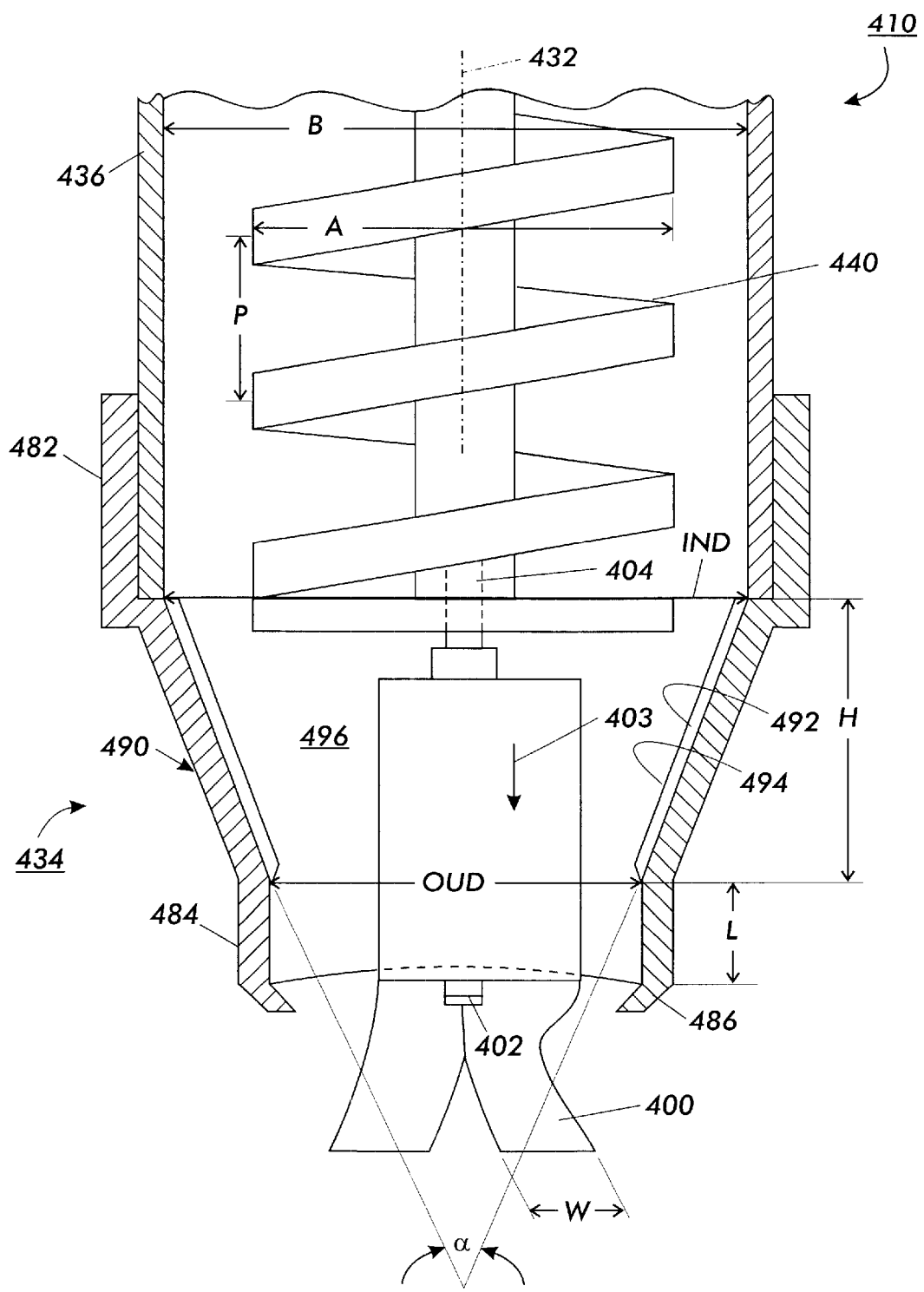
FIG. 11 is a cross-sectional schematic view of a deflector for use with a container filling system for use in the vibrofluidization powder filling process of the present invention.

Referring now to FIG. 11, the nozzle 434 is shown in greater detail. The nozzle 434 may be made of any suitable durable material, e.g. a plastic or a metal that is chemically non-reactive with the powder 412. For example, the nozzle 434 may be made of stainless steel.

The nozzle may have any suitable shape but includes an inlet 482 adjacent the conduit 436 as well as an outlet 484 opposed to the inlet 482. The nozzle 434 is secured to the conduit 436 in any suitable fashion. For example, as shown in FIG. 11, the nozzle 434 is press fitted over the conduit 436. It should be appreciated that the nozzle may be secured to the conduit by means of fasteners, glue or by welding. Preferably, extending inwardly from the outlet 484 are guide tabs 486 which serve to guide the nozzle 434 into the opening 442 of the container 16. Between the inlet 482 and the outlet 484 of the nozzle 434 is a central portion 490 of the nozzle. The central portion 490 preferably has a hollow substantially confrustrical shape or funnel like shape.

To assist in the flow of powder 412 within the interior of the nozzle 434, the central portion 490 of the nozzle 434 preferably is coated on inner periphery 492 of the nozzle 434 with a coating 494. The coating 494 is preferably made of a material with a low coefficient of friction. A coefficient of friction of less than 0.25 is preferred. Polytetrafluoroethylene is particularly well suited for this application.

The auger 440 is rotatably secured within the conduit 436. The auger 440 may float within the conduit 436 or be supported to the conduit 436 at its distal ends. The auger 440 may be of any particular configuration but preferably is a spiral auger. The auger 440 rotates at a suitable speed to optimize the flow of powder 412 through the nozzle 434.

For example, for a conduit 436 having a diameter B of 1.25 inches, the auger 440 preferably has an auger diameter A of approximately 1.0 inches. For an auger with an auger diameter A of 1.0 inches, the auger 440 may rotate at a rotational speed of approximately 500 rpm. For the auger with an auger diameter A of 1.0 inches, the auger 440 may have a pitch P or distance between adjacent blades of the auger of approximately 1.0 inches. It should be appreciated that the optimum rotational speed of the auger 440 is dependent on the value of the pitch P.

As shown in FIG. 11, the auger 440 may terminate at the inlet portion 482 of the nozzle. The invention may be practiced with the central portion 490 of the nozzle 434 including an empty cavity or chamber 496.

The nozzle 434 is designed such that the nozzle has an inlet diameter IND at inlet 482 which is larger than outlet diameter OUD such that the flow of powder for a given auger and rotational speed may be maximized. It should be appreciated that different powders have different densities and thus the dimensions of IND and OUD need to be varied for optimum flow of the powder. For example, as shown in FIG. 11, for a toner having a particles size of approximately 7 microns and utilizing an auger 440 with a rotational speed of 500 rpms, the inlet diameter IND is approximately 1.25 inches and the outlet diameter OUD is approximately 0.875 inches. For a nozzle with a distance between the inlet and outlet or height H of the central portion of approximately 0.7 inches, the included angle a of the inner periphery 492 of the nozzle 434 is approximately 20 degrees.

When utilizing the nozzle 434 to fill containers having an opening which is not concentric with the container, the use of a deflector 400 is preferred. Preferably, the deflector 400 is mechanically connected to the auger 440 and rotates therewith. As shown in FIG. 11, the deflector 400 is connected to holder 402. Holder 402 is secured to auger 440 by any suitable means. For example, the holder 402 is secured to auger 440 by means of threads 404.

The deflector 400 may be made of any suitable material. For example, the deflector may be made of plastic or metal. The deflector 400 may be made of stainless steel. As shown in FIG. 9, the deflector 400 is in the form of deflector blades. While the deflector 400 may be made from a single blade, preferably the deflector 400 includes a plurality of equally spaced blades around holder 402. As shown in FIG. 11, the deflector blade has a width W of approximately 0.60 inches for use when the nozzle 434 has an OUD of 0.875 inches.

Preferably, the outlet 484 extends in a direction of arrow 403 along axis 432 a distance L of 0.2 inches to permit the nozzle 434 to engage the opening 442 of container 16 (see FIG. 9).

Figure 12:
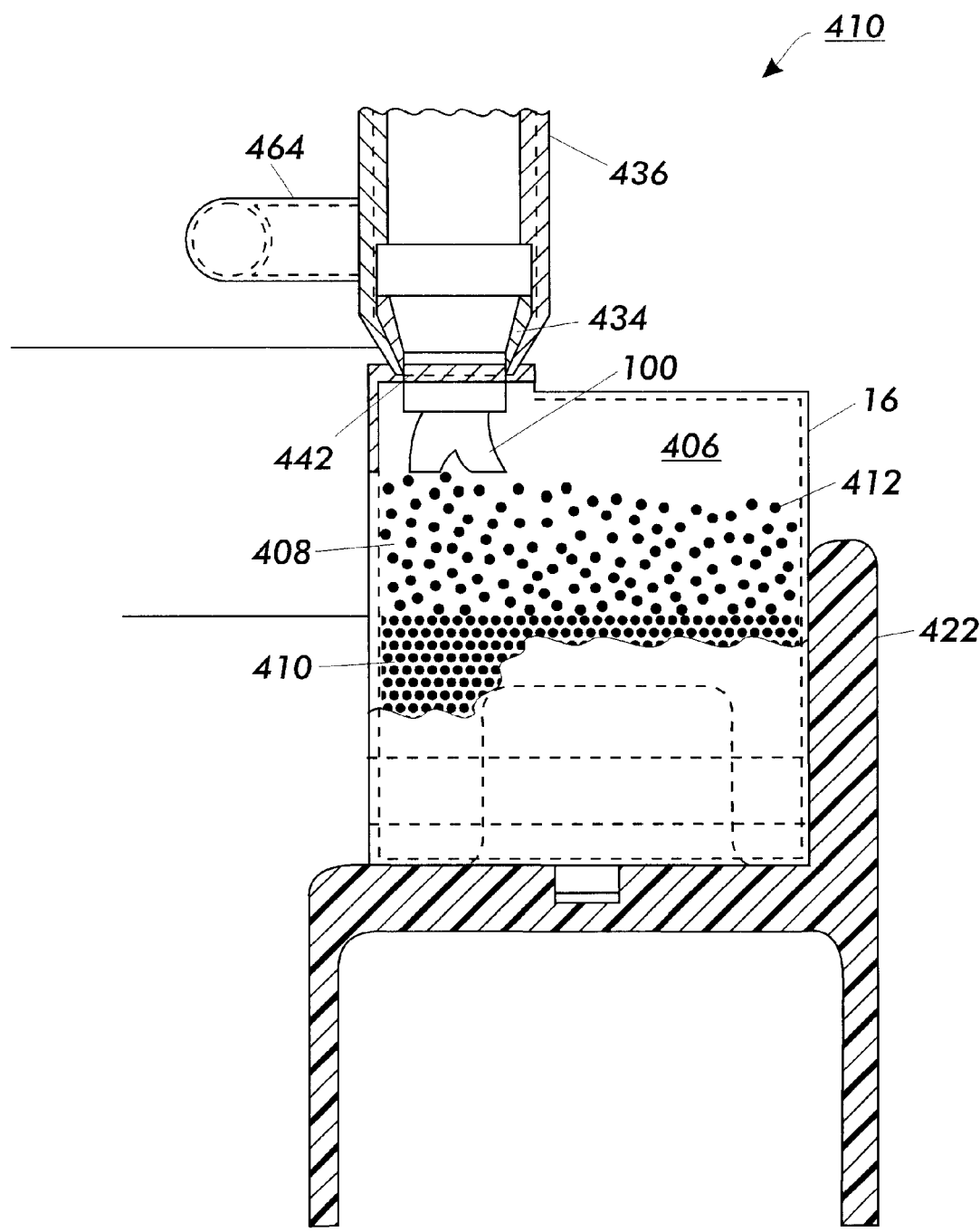
FIG. 12 is a partial elevational view of the container filling system partially in section utilizing the deflector of FIG. 11 showing the deflector in use to disperse the developer material with the filling system in the indexing position.

Referring now to FIG. 12, the toner filling assisting apparatus 440 is shown engaged with toner container 16. As shown in FIG. 12, the nozzle 434 is immersed into the toner container 16 through opening 442 therein. The deflector 400 is located within chamber 406 of the container 16. The deflector 400 serves to deflect the powder 12 within the container 16 to provide an area of airborne toner 408 in the upper portion of the container. As the airborne toner 408 settles, settled toner 110 forms uniformly within the container 16 assuring a thorough filling of the container 16.

The applicants have discovered that rather than vibroliquifying the entire volume of toner within the toner hopper, vibroliquifaction can occur locally around the fill tube of the toner hopper. By only vibroliquifying toner adjacent the fill tube the amount of energy required to vibroliquify the toner is greatly reduced. Also, the vibroliquifying of toner adjacent the fill tube can also serve as a method of metering the flow of toner adjacent the fill tube, permitting the vibroliquifying of the toner to serve also a the toner valve. Toner flow when the vibrator is activated and clogs when the vibrator is deactivated.

Figure 13:
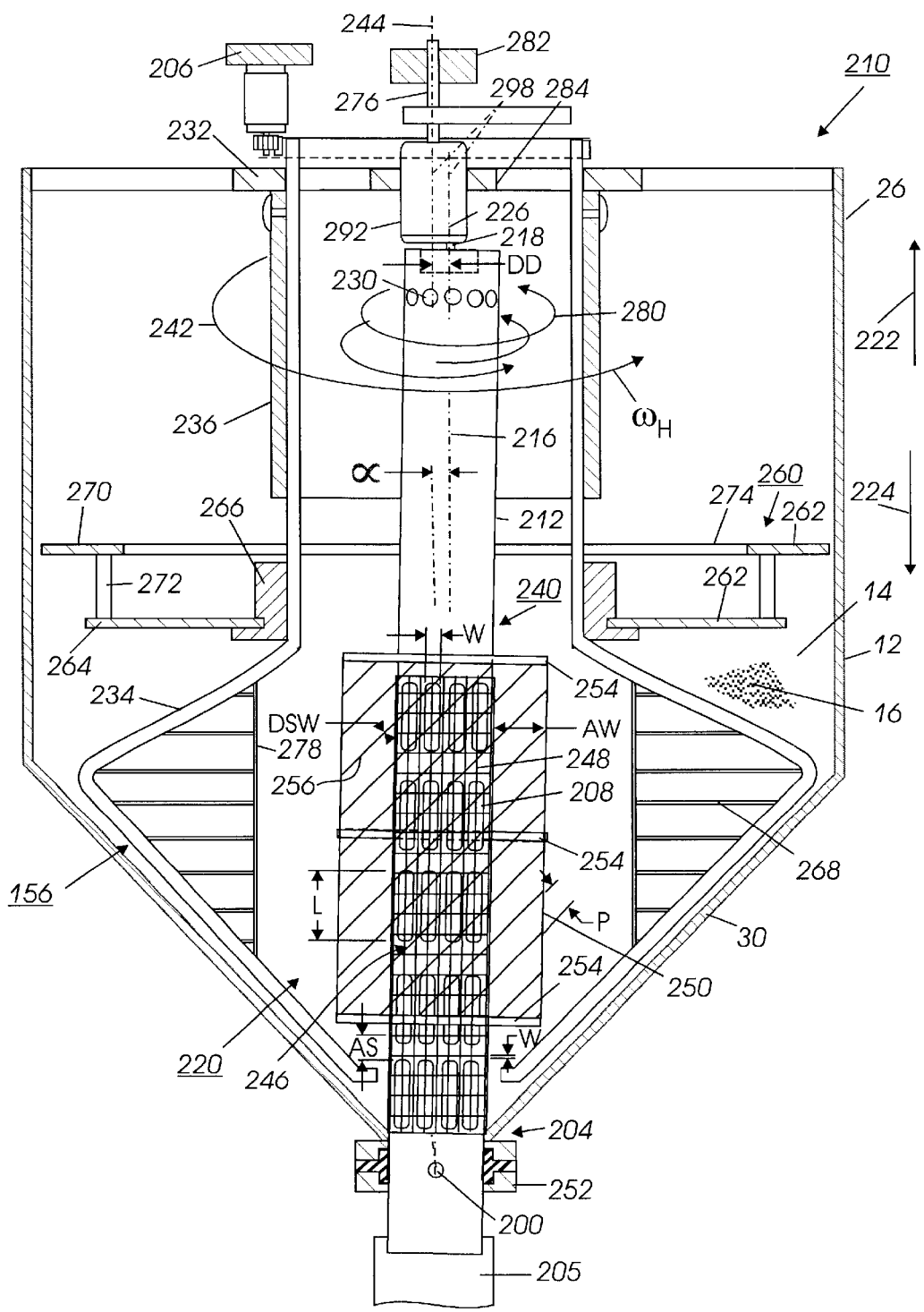
FIG. 13 is a cross-sectional schematic view of an alternate embodiment of a vibratory filler for developer material for use in the vibrofluidization powder filling process of the present invention.

An alternate embodiment of a toner vibroliquifaction device according to the present invention is shown in FIG. 13 which also serves as the toner valve.

The toner vibroliquifaction device is shown as an oscillating valve 210 and is positioned at least partially within hopper 12. The hopper 12 includes a chamber 14 for storing a quality of toner 16. The hopper may have upper portion 26 with a generally cylindrical shape and lower portion 30 with a conical shape.

It should be appreciated that the vibratory valve 210 includes any valve which causes a localized vibroliquifaction of toner. The toner is guided to that localized area and is caused to be vibroliquified by exciting the toner and caused to stop flowing or be clogged by stopping the excitation of the toner.

The vibratory valve 210 includes an acceleration device 220 for accelerating the toner in an upward direction with sufficient acceleration to increase the volume of the toner and thereby cause the toner to be vibroliquified.

Preferably, as shown in FIG. 13, the acceleration device 220 includes a tube 240. The tube 240 extends downwardly to hopper opening 204 in lower portion 30 of hopper 12. The tube 240 includes at least one aperture 208 in the periphery 212 thereof. While the tube 240 may operate with only a single aperture 208, preferably, the tube 240 includes a plurality of equally spaced apertures 208 through the periphery 212 of the tube 240.

The tube 240 may be supported within the hopper 12 in any suitable fashion for example, as shown in FIG. 13, the tube 240 is supported by eccentric bushing 292 in the upper portion of the hopper 12 and is sealed at flange 252 mounted to hopper 12.

As shown in FIG. 13, preferably, the tube 240 includes apertures 208 in the form of elongated slots extending in a vertical direction parallel to tube axis 216. The slots 208 have a length L and a width W. The dimensions for length L and width W depend on the desired flow, the amplitude of the vibrations of the valve 210 and the type of powder dispensed. As shown in FIG. 13, the apertures are equally spaced around tube 240. The apertures 208 may be located on several rows. As shown in FIG. 13, there are five rows of apertures 208. The tubing 240 is caused to pivot and oscillate about flange 252. This may be accomplished in any suitable fashion.

For example, as shown in FIG. 13, the tube 240 is supported on its upper end by a stem 218. The stem 218 may extend upwardly from the upper end of tube 240.

An eccentric bushing 292 extends downwardly from shaft 276. The bushing is connected to the shaft 276 and rotates therewith about shaft axis 244. Shaft 276 rotates by any suitable manner, for example, by shaft motor (not shown). The shaft 276 is supported by bearings 282 and 284. The shaft rotates in direction of arrow 280 at a rotational speed $\omega_s$ of approximately 3,000 revolutions per minute.

The bushing 292 includes an offset bore 226 having a centerline 298 offset from the shaft centerline 244 a distance DD. The stem 218 is rotatably fitted into the offset bore 226. As the eccentric bushing 292 rotates with the shaft 276 at rotational speed $\omega_s$ of 3,000 RPM the stem 218 orbits about the eccentric bushing centerline 244 at a frequency of 3,000 cycles per minute or 50 cycles per second or 50 Hertz. To minimize vibrations of the acceleration device 220, the shaft 276 and bushing 292 are dynamically balanced.

While the upper end of the tube orbits about centerline 244, the lower end of tube 240. pivots about vertical centerline 200 of flange 252.

The amplitude of the oscillation of the tube 240 at any point in the mechanism in the vertical direction may be defined by Formula:

$$A_i = R_i \tan \alpha$$

where:

$A_i$ is the amplitude of the oscillation in the vertical direction at any point of the mechanism $R_i$ is the horizontal distance from the shaft axis 244 to that point in the mechanism $\alpha$ is the angle between axis 216 and axis 244 with the root at the point O Further, the acceleration of the oscillations in the vertical direction which creates the effect of vibroliquifaction may be defined by the formula:

$$Am = 2L/t^2$$

where:

Am is the maximum acceleration of the oscillations in the vertical direction of any point on the tube;

L is the amplitude of acceleration t is time equal to ¼ of the duration of the full cycle of oscillation called "Period of oscillation" or T With rotation of the eccentric bushing 292, the upper section of the tube 240 performs nutation with the frequency of the shaft 276. The toner adjacent the tube 240 is greatly influenced by the vibration. Influenced by this vibration, the toner 16 near pipe 240 is vibro-liquefied and flows through the apertures 208 in the periphery 212 of the tube 240 into the inside of tube 240. By the force of gravity, the toner freely falls through the interior of the tube 240. The toner may fall directly into a toner cartridge (not shown) or may alternatively enter fill tube 205. From the fill tube 205, the toner 16 is dispensed into the toner cartridge. If the toner is dispensed directly from tube 240 into the toner cartridge, care must be taken to avoid having toner dust contaminate the filling line.

Preferably the tube 240 includes decompression or venting perforations or holes 230 through the periphery 214 of the tube 240 near the upper end of tube 240. The decompression perforations 230 serve to provide air access inside the tube 240 to allow free access of air through the interior of tube 240 to permit the toner 16 to freely fall within the tube 240. To prevent the clogging of the perforations 230 by the toner 16, preferably a protective cap 236 in the form of a sleeve is position around the tube at the perforations 230.

When the shaft motor is stopped, the nutation of the tube 240 stops and the vibroliquifaction of the toner at apertures 208 stops. The toner 16 bridges over the apertures 208 and the flow stops. Dispensing of the toner 16 thus can be controlled simply by starting and stopping the shaft motor.

While the system as described above will provide for the vibroliquifaction of toner and improve flow of toner, the dispensing of the toner may not be closely controlled. Preferably, therefore, additional structure has been discovered by the applicants which will improve the control of the toner flow. For example, as shown in FIG. 13, first grid 246 is used to increase the uniformity of toner flow into the tube 240 at the apertures 208.

The first grid 246 may be made of any suitable durable material which is chemically non-reactive with toner 16 and which assists in regulating the flow of toner. For example, the grid 246 may be made of a series of first grid wires 248. The wires 248 may for example be made of stainless steel. The first grid wires 248 have a wire diameter WR, of perhaps 0.05 inches, preferably, located over periphery 212 of tube 240 at least adjacent the apertures 208. The first grid wires 248 may be placed in any reasonable pattern. As shown in FIG. 13, the wires are spaced circumferentially on the periphery of tube 240. The wires 248 are preferably spaced apart a distance AS from each other, for example 0.5 inches.

The flow rate may be uniformly controlled with the use of first grid 246. Preferably, however, the acceleration device 220 further includes a second grid 250. The second grid 250 may have any suitable configuration capable of improving the flow rate uniformity. For example, as shown in FIG. 13, the second grid 250 includes a series of second grid wires 256 spaced a distance AW from the periphery 212 of the tube 240. The second grid wires 256 are supported by any suitable method around the tube 240. For example, the wires 256 are supported by rings 254 extending outwardly from the periphery 212 and secured thereto. The wires 256 are secured to ring 254 in any suitable manner, but, preferably, as shown in FIG. 13, the wires 256 are uniformly positioned around ring 256 a distance P from each other. The wire 256 are preferably horizontally oriented, but are shown diagonally in FIG. 13 for clarity. The second grid 250 is preferably positioned around the apertures 208 to improve the uniformity of the flow of toner 16 into the apertures and thereby increasing the flow through the apertures.

Since the vibratory valve 210 of FIG. 13 causes the toner 16 to vibroliquify in localized areas adjacent the apertures 208, the applicants have found that the toner flows rapidly adjacent the apertures 208 and has a tendency to "rat hole" or have cavities spaced from the apertures which rat holes stop the progressing of the vibrations within the acceleration device t220, thus inhibiting the vibroliquifaction process around the apertures 208. Thus the rat holes tend to provide an air gap between the vibroliquified toner adjacent the apertures and the remaining toner within the hopper 12. An agitator 156 has thus been utilized to advance the toner 16 within hopper 12 toward the apertures 208.

The agitator 156 may have any structure and may be made of any materials suitable for transferring the toner 16 toward apertures 208. For example, the agitator 156 may include an agitator blade 234. To balance the forces within agitator 156, preferably, the agitator 156 includes two opposed blades 234. The blades 234 are supported in any suitable fashion. For example, the blades 234 are connected by circular disk 266. Wire braces 268 and 278 help to mix and move the toner toward the tube 240. The agitator 156 preferably rotates around tube 240. The agitator 156 is supported at its upper end by upper bearing 232. Bearings 232 is mounted to hopper 12. Thus, the agitator 156 rotates about shaft axis 244.

To reduce the impact of hydrostatic pressure on the upper layer of toner, applicants have found that the addition of features in the form of rings are helpful. Preferably, the agitator 156 includes bottom ring 264 extending from disk 266. Bottom ring 264 is fixedly secured to agitator 156 and rotates therewith. Preferably, a top ring 270 is positioned spaced from and above bottom ring 264 and is supported by braces 272 and spokes 274. Top ring 270 also rotates with agitator 156. The agitator 156 is caused to rotate in any suitable fashion, for example, by agitator motor 206. The agitator 156 rotates in the direction of arrow 242 and a rotational speed $\omega_H$ of approximately 3 to 45 revolutions per minute.

Applicants have discovered that the component of the acceleration of the acceleration device 220 in the direction of arrow 222 opposed to the direction of gravity as shown in arrow 224 is responsible for the vibroliquifaction of the toner. A device for accelerating toner is most efficient, therefore, when moving toner substantially in the direction of arrow 222. Thus, a vibratory valve which has an acceleration device which moves in the direction of arrow 222 exclusively would be preferred.

Referring now to FIG. 14 vibratory valve 310 is shown. Valve 310 is similar to valve 210 except that tube 340 moves exclusively in the direction of arrows 322 and 324, reciprocating therebetween.

The vibratory valve 310 is similar to valve 210 of FIG. 13. Valve 310 includes an acceleration device 320 which is similar to acceleration is device 220 of FIG. 13 except that the tube 340 unlike tube 240 of FIG. 13 moves exclusively in a direction parallel to centerline axis 316. Tube 340 thus moves upwardly in direction of arrow 322 and downwardly in direction of arrow 324.

Any suitable method may be used for oscillating the tube 340. For example as shown in FIG. 14, the tube 340 is rigidly connected to cams 384 and 388. Rollers 386 are positioned between lower cam 384 and upper cam 388 and when rotated force the tube to oscillate. Rollers 386 are rotated by auger shaft 376. The auger shaft 376 may be rotated in the direction of arrow 380 at a rotational speed $\omega_{SS}$ of approximately 4,500 revolutions per minute by any suitable device, for example, by shaft motor 307.

As the auger shaft 376 rotates, the rollers likewise rotate in the horizontal plane and cause the cams 384 and 388 which are fixedly secured to cam support 387 to move upwardly and downwardly. The cams 384 and 388 are fixedly connected to tube 340 by cam support 387. Cam support 387 slides upward and downwardly within agitator shaft 389 within the slots 390. The cams 384 and 388 cause tube 340 to oscillate upward and downwardly in the direction of arrows 322 and 324. The tube 340 protrudes through the hopper 12 at lower bushings 374 which is secured to tube flange 352 and is secured to the cam containing system.

The tube 340 preferably includes apertures 308 located in the tube walls. The apertures 308 are similar to apertures 208 of FIG. 13. Toner is caused to progress through apertures 308 when the tube 340 is caused to oscillate. The toner is caused to clog in the aperture 308 when the auger shaft 376 does not rotate. To assist in controlling the flow of toner, the apertures 308, preferably, a grid 346 similar to grid 246 of FIG. 13 is applied over the tube 340 at least adjacent the apertures 308. While the tube 340 as shown includes only first grid 346, it should be appreciated that the tube 340 may also include a second grid (not shown) spaced from first grid 346, which may be similar to second grid 250 of FIG. 13.

As shown in FIG. 14 the tube is caused to oscillate in the direction of tube axis 316 by an auger shaft and cam mechanism. It should be appreciated that any other mechanism capable of oscillating the tube will be sufficient. For example, the tube 340 may be oscillated by an electromechanical vibrator.

The tube 340 may oscillate at any frequency but, preferably oscillates at a frequency of approximately 10 to 200 Hertz with 69 Hertz being preferred.

The tube 340 oscillates in the direction of tube axis 316 in upward direction 322 and downward direction 324 with a stroke or oscillation distance DH of approximately 0.06 inches. The amplitude of the oscillations effects the acceleration of the particles and the ability of the toner to become vibroliquified.

The acceleration of the oscillations in the vertical direction which creates the effect of vibroliquifaction may be defined by the formula:

$$Am = A_t \omega^2$$

where:

$Am$ is the acceleration of the oscillations in the vertical direction;

$A_t$ is the amplitude of the oscillations at any point on the tube;

$\omega$ is the angular rotation speed 380 of the shaft 376

As with the valve 210, the valve 310 preferably includes an agitator 356 similar to agitator 156 of FIG. 13. The agitator 356 serves to move the toner particles toward the apertures 308. The agitator 356 is similar to agitator 156 of FIG. 13.

The agitator 356 preferably includes a pair of agitator blades 354 similar to blades 254 of agitator 156. The agitator blades are secured to the agitator by a fastening ring 358 and by a disk 366. Braces 378 and braces 368 provide additional agitation.

The agitator 356 may be made of any suitable, durable non chemically reactive material, for example, stainless steel. The disk 366 is connected to an agitator shaft 389. The agitator shaft is rotated in the direction of arrow 342 and at angular rotational speed $\omega_{\omega\omega}$ of approximately 5 to 45 revolutions per minute. The agitator 356 is rotatably supported around agitator axis 316 by upper bearing 332. The bearing 332 is secured to hopper 12.

The tube 340 is preferably fixedly secured to cam support 387, while the cam support is slidably secured to agitator shaft 389. The agitator shaft is fixedly secured to agitator and rotates therewith. The tube 340 thus tends to rotate with the agitator 356. It should be appreciated that the valve 310 may be constructed such that the tube 340 does not rotate or rotates at a speed different from that of the agitator 365.

Preferably, to reduce the impact of hydrostatic pressure on the upper layer of the toner, the agitator 356 preferably also includes a feature, for example rings, for reducing hydrostatic pressure. The rings preferably include a bottom ring 364 connecting to disk 366. Extending upwardly from bottom ring 364 is top ring 370. Top ring 370 is connected to bottom ring 364 by braces 372. The rings 364 and 370 rotate with the agitator blades 354 and are connected thereto.

By providing a method for filling a powdered container including is a step of vibrofluidizing the powder to improve its flow properties greatly enhances the flow of material through a conduit and greatly improves the speed and completeness of the filling of a container with the powder.

By providing a method of filling a powdered container in which the vibrofluidizing of the powder is performed at a frequency from about 50 Hz to about 80 Hz, the powder may flow much more quickly and more completely fill a container.

By providing a method for filling a powder container including the step of vibrofluidizing the powder by providing the powder by subjecting the powder to a vibrational amplitude of at least 0.2 cm, the flow of the powder through a conduit and into a container may be greatly increased.

By providing a vibratory toner filling method which subjects the toner to an acceleration which increases the toner volume by at least 10 percent, toner vibroliquifaction which increases toner flow rates by as much as 40 times can occur.

By providing a toner filling method which includes the step of mechanically exciting the toner with a vibration source of from ten to 200 Hertz, the toner may become vibroliquified, greatly increasing its flow properties.

By providing a toner filling method which includes the step of mechanically exciting the toner with an upward acceleration of at least 32 feet per second squared, the toner may become vibroliquified, greatly increasing its flow properties.

By providing an apparatus for assisting the flow of toner from a hopper with the apparatus having a member connected to a body with the member orbiting about the body to provide a vertical acceleration force to the toner, toner vibroliquifaction and resulting increased flow can occur.

By providing an apparatus with a orbiting second member rotating with a flexible coupling around a first member, a vertical acceleration may be imparted to the toner to cause toner vibroliquifaction and thus improved toner flow.

In recapitulation, a vibratory filler for developer material has been described as a improved method for vibroliquifying toner flow for filling toner containers. This method allows toner to be moved more accurately and rapidly than prior art systems and also insures that the toner container is filled completely and cleanly.

It is, therefore, apparent that there has been provided in accordance with the present invention, an vibratory toner filler that fully satisfies the aims and advantages hereinbefore set forth. While this invention has been described in conjunction with specific embodiments, it is evident that many alternatives, modifications, and variations will be apparent to those skilled in the art. Accordingly, it is intended to embrace all such alternatives, modifications and variations that fall within the spirit and broad scope of the appended claims.

We claim:

1. A method for filling a powder container, comprising:
   placing a first powder container to be filled in filling relationship to a supply of powder in a vessel;
   vibrofluidizing the powder in the vessel to improve its flow properties;
   dispensing powder from the vessel into the first container;
   removing the first container from the vessel;
   placing a second container to be filled in filling relationship to the vessel; and
   providing a deflector operably associated with a conduit for deflecting the powder as it exits said conduit.

2. A method for filling a powder container as claimed in claim 1 wherein the powder has a particle size of less than 70 microns; and
   wherein the step of vibrofluidizing the powder comprises the step of subjecting the powder to a vibration source with a frequency of from about 30 Hertz to about 120 Hertz.

3. A method for filling a powder container as claimed in claim 2, wherein the step of vibrofluidizing the powder comprises the step of subjecting the powder to a vibrational amplitude of at least 0.1 centimeters in an upwardly direction.

4. A method for filling a powder container as claimed in claim 1, wherein the step of vibrofluidizing the powder comprises the step of increasing the volume of the powder by at least 10%.

5. A method for filling a powder container as claimed in claim 1, wherein the step of dispensing powder from the vessel into the first container comprises the step of applying a magnetic field to the fill tube to control the flow of powder through the fill tube and into the first container.

6. A method of claim 1, wherein vibrofluidizing includes using a vibrating mechanical system to create an amplitude and frequency to decrease friction of the powder.

7. A method of claim 5 wherein the step of applying a magnetic field to the fill tube includes using a solenoid.

8. A method for filling a powder container, comprising:
    placing a first powder container to be filled in filling relationship to a supply of powder in a vessel;
    vibrofluidizing the powder in the vessel to improve its flow properties;
    dispensing powder from the vessel into the first container;
    removing the first container from the vessel; and
    placing a second container to be filled in filling relationship to the vessel;
    wherein the step of dispensing powder from the vessel into the first container comprises the steps of:
    positioning a conduit between the vessel and the first container;
    directing substantially all the flow of the powder from the vessel toward a pliable member located at least partially within the conduit and located adjacent the vessel,
    positioning the pliable member into a first position within the conduit;
    conforming the pliable member into a first position in close conformity with the inner periphery of the conduit wherein a passageway is formed within the conduit which does not constrain the flow of the powder through the conduit; and
    conforming the pliable member into a second position in spaced from the inner periphery of the conduit wherein the flow of the powder through the conduit is restricted.

9. A method for filling a powder container, comprising:
    placing a first powder container to be filled in filling relationship to a supply of powder in a vessel;
    vibrofluidizing the powder in the vessel to improve its flow properties;
    dispensing powder from the vessel into the first container;
    removing the first container from the vessel; and
    placing a second container to be filled in filling relationship to the vessel;
    wherein the step of dispensing powder from the vessel into the first container comprises the steps of:
    directing the powder in the vessel toward a member located at least partially within the vessel, the member defining a restriction therein such that the powder clogs within the restriction;
    mechanically exciting the powder at least adjacent the restriction to improve the flow properties of the powder so as to unclog the powder within the restriction;
    dispensing powder through the restriction, through the discharge feature and into the first container; and
    stopping the mechanical excitation of the powder so as to clog the restriction with the powder.

10. A method for filling a powder container, comprising:
    placing a first powder container to be filled in filling relationship to a supply of powder in a vessel;
    vibrofluidizing the powder in the vessel to improve its flow properties;
    dispensing powder from the vessel into the first container;
    removing the first container from the vessel; and
    placing a second container to be filled in filling relationship to the vessel;
    wherein the powder has a particle size of less than 70 microns; and
    wherein the step of vibrofluidizing the powder comprises the step of subjecting the powder to a vibration source with a frequency of from about 30 Hertz to about 120 Hertz.

11. A method for filling a powder container as claimed in claim 10, wherein the step of vibrofluidizing the powder comprises the step of subjecting the powder to a vibrational amplitude of at least 0.1 centimeters in an upwardly direction.

* * * * *